United States Patent
Kobayashi et al.

(10) Patent No.: US 11,625,199 B2
(45) Date of Patent: Apr. 11, 2023

(54) COMMUNICATION APPARATUS, COMMUNICATION METHOD, AND COMPUTER PROGRAM PRODUCT

(71) Applicant: KABUSHIKI KAISHA TOSHIBA, Minato-ku (JP)

(72) Inventors: Yuta Kobayashi, Ota (JP); Takahiro Yamaura, Kawasaki (JP); Masashi Ito, Yokohama (JP); Yasin Oge, Sagamihara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 68 days.

(21) Appl. No.: 17/004,233

(22) Filed: Aug. 27, 2020

(65) Prior Publication Data

US 2021/0149603 A1 May 20, 2021

(30) Foreign Application Priority Data

Nov. 14, 2019 (JP) .............................. JP2019-206315

(51) Int. Cl.
*G06F 3/06* (2006.01)
*G06F 9/455* (2018.01)
*G06F 9/48* (2006.01)

(52) U.S. Cl.
CPC .......... *G06F 3/0664* (2013.01); *G06F 3/0604* (2013.01); *G06F 3/0659* (2013.01);
(Continued)

(58) Field of Classification Search
CPC ....... G06F 9/45558; G06F 2009/45591; G06F 9/4881; G06F 3/0659; G06F 3/0604;
(Continued)

(56) References Cited

U.S. PATENT DOCUMENTS 9,454,497 B2 9/2016 Nakajima et al.
2010/0217916 A1 8/2010 Gao et al.
(Continued)

FOREIGN PATENT DOCUMENTS

EP 3 461 086 A1 3/2019
JP 2012-514386 A 6/2012
(Continued)

OTHER PUBLICATIONS

Diakhate, F., et al., "Efficient shared memory message passing for inter-VM Communications", Dec. 31, 2009, Lecture Notes in Computer Science, pp. 53-62, XP047548843.

*Primary Examiner* — David Yi
*Assistant Examiner* — Zubair Ahmed
(74) *Attorney, Agent, or Firm* — Oblon, McClelland, Maier & Neustadt, L.L.P.

(57) ABSTRACT

According to an embodiment, a communication apparatus includes a writing unit, a transfer control unit, a descriptor receiving unit, and a reading unit. The writing unit writes a frame in a first virtual storage area. The transfer control unit controls a timing for transferring a descriptor of the frame based on schedule information. The descriptor receiving unit receives the descriptor. The reading unit that reads the frame from a second virtual storage area specified based on the descriptor when the descriptor is received by the descriptor receiving unit.

11 Claims, 19 Drawing Sheets

(52) U.S. Cl.
CPC ........ G06F 3/0673 (2013.01); G06F 9/45558 (2013.01); G06F 9/4881 (2013.01); *G06F 2009/45591* (2013.01)

(58) Field of Classification Search
CPC ......... G06F 3/0664; G06F 2009/45595; G06F 2009/45583; G06F 3/0673
USPC ................................................ 711/154, 100
See application file for complete search history.

(56) References Cited

U.S. PATENT DOCUMENTS

| | | | |
|---|---|---|---|
| 2013/0232491 A1* | 9/2013 | Radhakrishnan | G06F 9/5077 718/1 |
| 2015/0365337 A1* | 12/2015 | Pannell | H04J 3/0697 370/503 |
| 2020/0028791 A1* | 1/2020 | McGrath | H04L 43/50 |
| 2020/0089525 A1 | 3/2020 | Kobayashi et al. | |

FOREIGN PATENT DOCUMENTS

| | | |
|---|---|---|
| JP | 2018-133758 A | 8/2018 |
| JP | 2019-057817 A | 4/2019 |
| JP | 2020-48045 A | 3/2020 |

\* cited by examiner

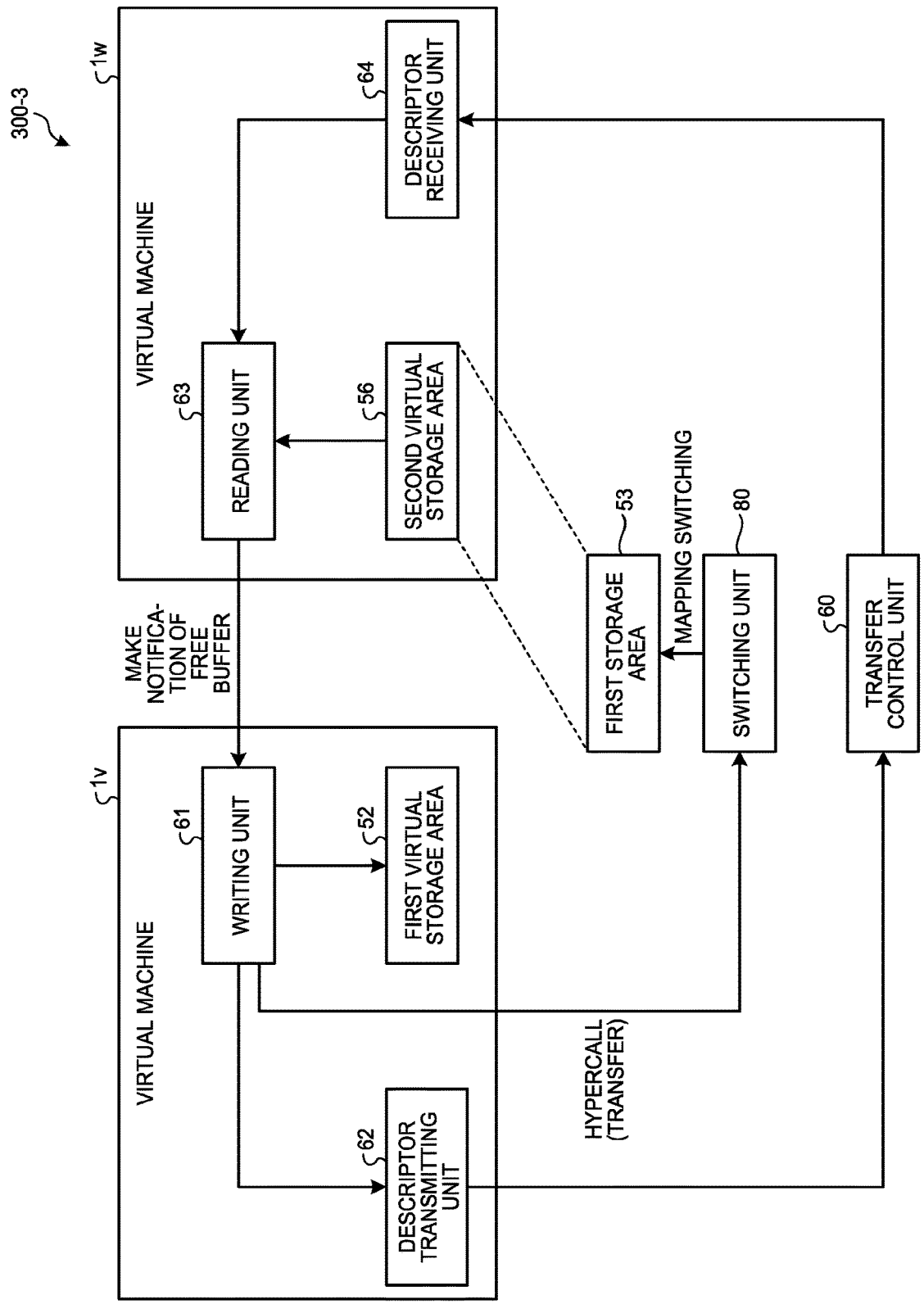

COMMUNICATION APPARATUS, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2019-206315, filed on Nov. 14, 2019; the entire contents of which are incorporated herein by reference.

FIELD

Embodiments described herein relate generally to a communication apparatus, a communication method, and a computer program product.

BACKGROUND

Real-time performance is required in fields such as an industrial network that connects devices in a factory and an in-vehicle network that connects a controller of an in-vehicle system. In recent years, Ethernet (registered trademark) has been increasingly used in the industrial network and the in-vehicle network, and various real-time Ethernet standards have been proposed.

BRIEF DESCRIPTION OF THE DRAWINGS

FIG. 17B is a diagram illustrating the example (after mapping switching) of the functional configuration of the communication apparatus according to the third embodiment;

DETAILED DESCRIPTION

Figure 1:
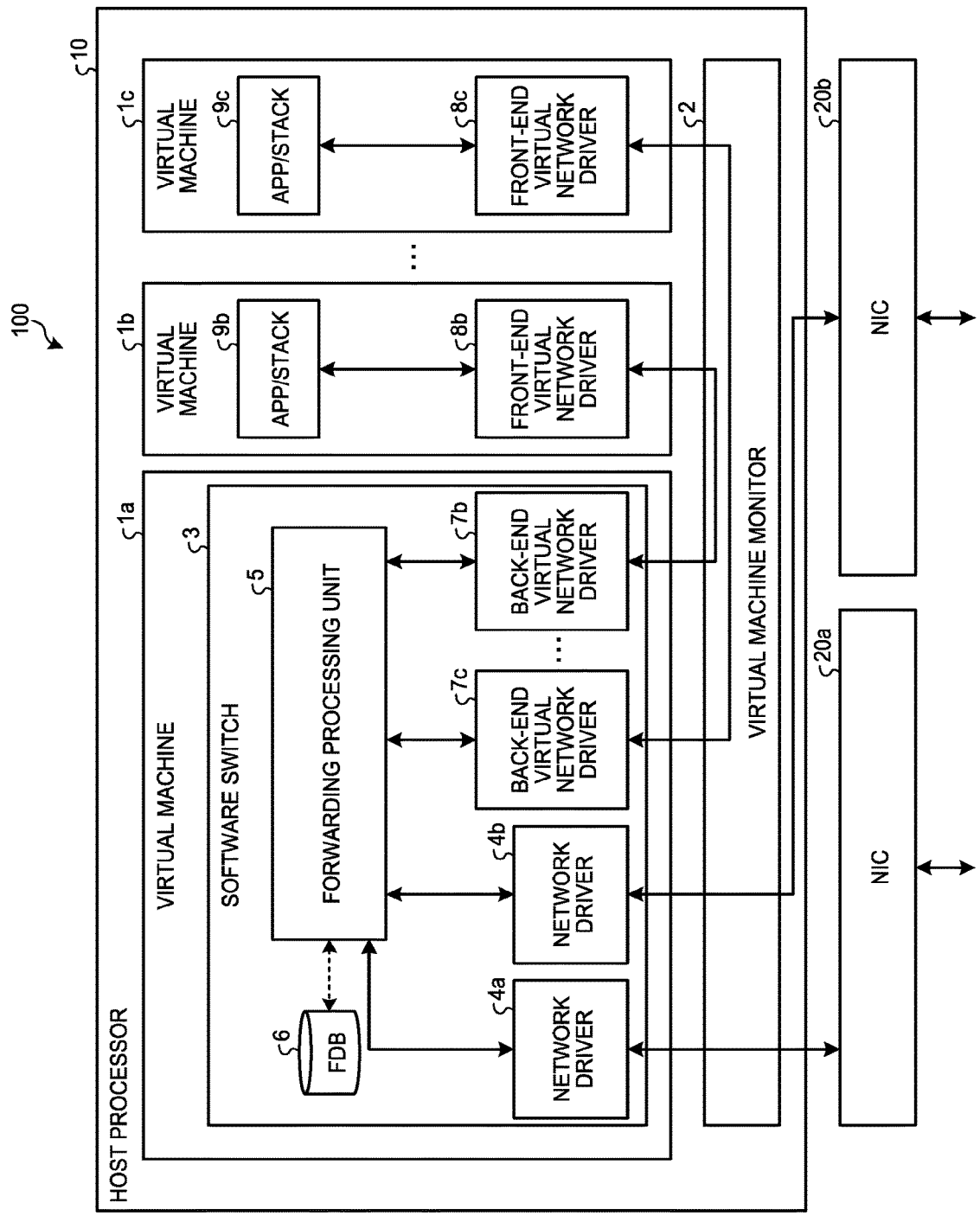
FIG. 1 is a schematic diagram illustrating an example of a communication apparatus in which a plurality of virtual machines operate.

According to an embodiment, a communication apparatus includes a writing unit, a transfer control unit, a descriptor receiving unit, and a reading unit. The writing unit writes a frame in a first virtual storage area. The transfer control unit controls a timing for transferring a descriptor of the frame based on schedule information. The descriptor receiving unit receives the descriptor. The reading unit that reads the frame from a second virtual storage area specified based on the descriptor when the descriptor is received by the descriptor receiving unit.

Exemplary embodiments of a communication apparatus, a communication method, and a program will be explained below in detail with reference to the accompanying drawings.

A virtual computer technology has been applied to industrial systems and in-vehicle systems. By consolidating multiple virtual machines on one physical computer, cost reduction and other effects can be expected. Against such a background, a software switch for communication processing between virtual machines is also required to support real-time Ethernet.

In a case where real-time communication processing between virtual machines is implemented by software, a delay in communication processing becomes a problem. Specifically, overhead caused by data copy and hypercall issuance at the time of data delivery between virtual machines has a great influence. As a method of reducing the number of times the data copy is performed and the number of times issuance of a hypercall is performed, a method in which a dedicated storage area is prepared for each combination of virtual machines that perform communication without using the software switch (a memory area of a transmission source virtual machine and a memory area of a destination virtual machine are directly mapped to each other), and each virtual machine independently executes frame transfer processing (a dedicated network is prepared for each combination of a transmission source virtual machine and a destination virtual machine) can be considered. However, with this method, it is not possible to implement frame transfer in which respective network nodes required for real-time communication are synchronized.

Description of TSN

First, an example of a standard used in fields such as industrial networks and in-vehicle networks that require high real-time performance will be described.

For example, as a standard for realizing real-time performance on Ethernet (registered trademark), standardization of Time-Sensitive Networking (TSN) is in progress by IEEE 802.1 TSN Task. TSN includes a plurality of standards. TSN is a standard that extends Audio/Video Bridging (AVB) and realizes low latency, which is used for professional audio and the like. TSN is a standard that aims to achieve high reliability in addition to higher real-time performance than AVB so that it can be applied to industrial networks and in-vehicle networks.

One of the TSN standards is IEEE 802.1Qbv. IEEE 802.1Qbv enables a strict control of a transmission timing of data (frame) for each priority (traffic class) by controlling a plurality of transmission buffers (transmission queues in IEEE 802.1Qbv) with different priorities according to preset schedule information (gate control list). Each transmission buffer is provided with a gate that permits data transmission. When the gate is open (open state), data transmission is permitted, and when the gate is closed (close state), data transmission is prohibited.

Description of Virtual Machine and Software Switch

Next, an example in which a software technology such as a virtualization technology is applied to an industrial system, an in-vehicle system, and the like will be described. For example, it is conceivable to implement a switch (virtual switch) that connects virtual machines with software.

FIG. 1 is a schematic diagram illustrating an example of a communication apparatus 100 in which a plurality of virtual machines 1a to 1c operate. The example of FIG. 1 illustrates a case where a switch function is implemented by the virtual machine 1a operating on a host processor 10. The communication apparatus 100 includes the host processor 10 and network interface cards (NICs) 20a and 20b. Hereinafter, when the NICs 20a and 20b need not be distinguished, the NICs 20a and 20b will be simply referred to as NIC 20.

The host processor 10 is a device that controls the communication apparatus 100. The NIC 20 is a physical interface of the communication apparatus 100. A virtual machine monitor 2 controls the virtual machines 1a to 1c. The virtual machine monitor 2 is implemented by the host processor 10. The virtual machines 1a to 1c operate on the virtual machine monitor 2.

The virtual machine 1a includes a software switch 3. The software switch 3 includes network drivers 4a and 4b, a forwarding processing unit 5, a forwarding/filtering database (FDB) 6, and back-end virtual network drivers 7b and 7c.

The network drivers 4a and 4b control communication between the NIC 20 and the forwarding processing unit 5. The network drivers 4a and 4b read a frame (data) received by the NIC 20 and input the frame to the forwarding processing unit 5. Further, the network drivers 4a and 4b write a frame received from the forwarding processing unit 5 into the NIC 20.

The forwarding processing unit 5 refers to the FDB 6 to control a transfer destination of the frame.

The back-end virtual network drivers 7b and 7c control communication between the virtual machine 1a in which the software switch 3 operates and other virtual machines 1b and 1c (guest OSs).

The virtual machine 1b includes a front-end virtual network driver 8b and an application/network stack (app/stack) 9b. The front-end virtual network driver 8b controls communication between the app/stack 9b and the software switch 3.

The virtual machine 1c includes a front-end virtual network driver 8c and an application/network stack (app/stack) 9c. The front-end virtual network driver 8c controls communication between the app/stack 9c and the software switch 3.

Description of Implementation of IEEE 802.1Qbv with Software Switch

A case of implementing communication processing that strictly controls a transmission timing of each frame, such as IEEE 802.1Qbv with a software switch will be described.

Figure 2:
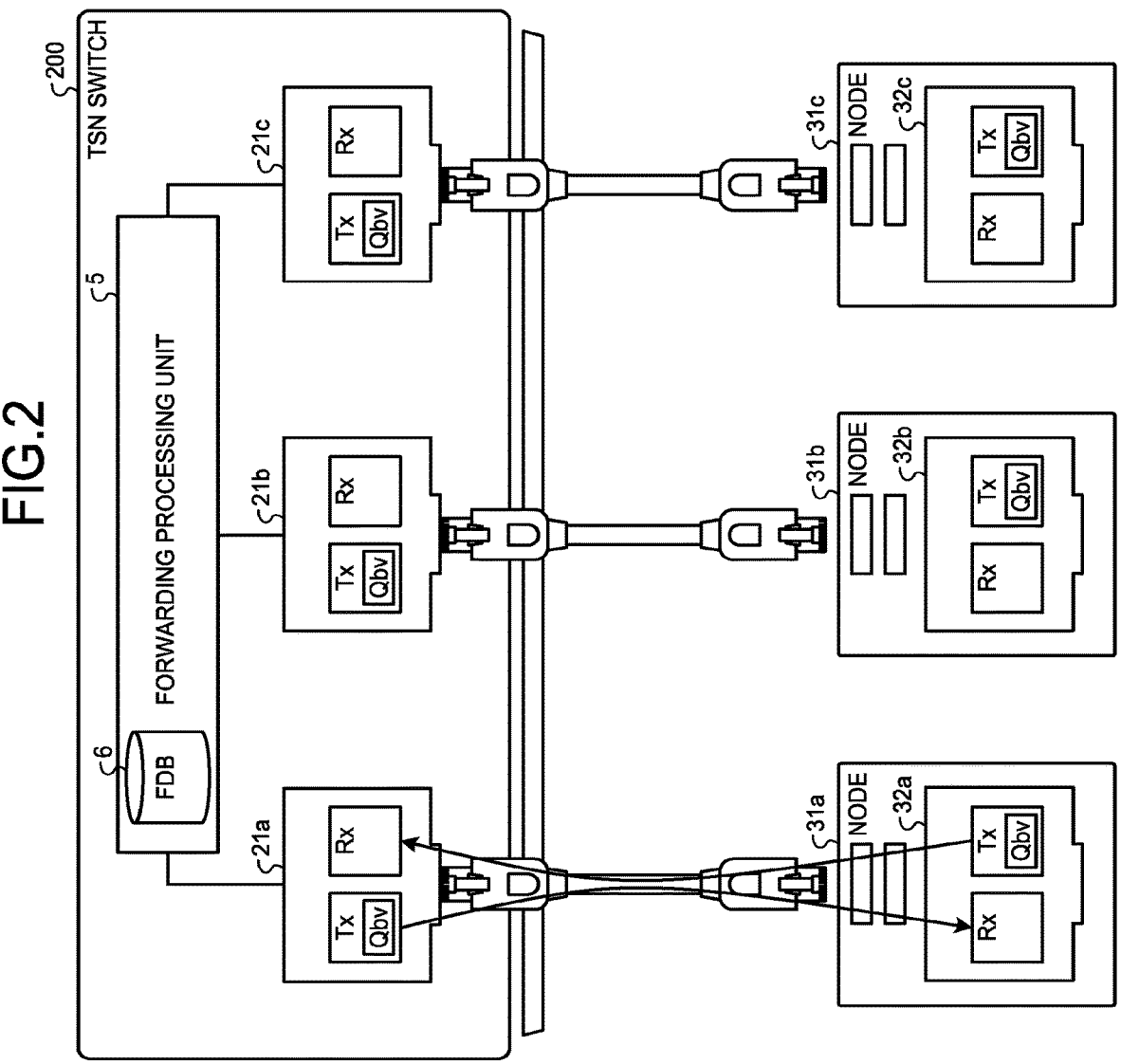
FIG. 2 is a diagram illustrating an example of a Qbv-compatible Time-Sensitive Networking (TSN) switch using normal hardware.

FIG. 2 illustrates an example of a Qbv-compatible TSN switch 200 using normal hardware. In FIG. 2, the TSN switch 200 includes three network interfaces 21a to 21c. The network interfaces 21a to 21c are connected to network interfaces 32a to 32c of nodes 31a to 31c, respectively. Each of the network interfaces 32a to 32c executes transmission processing (Tx) and reception processing (Rx). The transmission processing (Tx) is compatible with IEEE 802.1Qbv, and determines a frame transmission timing according to preset schedule information (Qbv).

Figure 3:
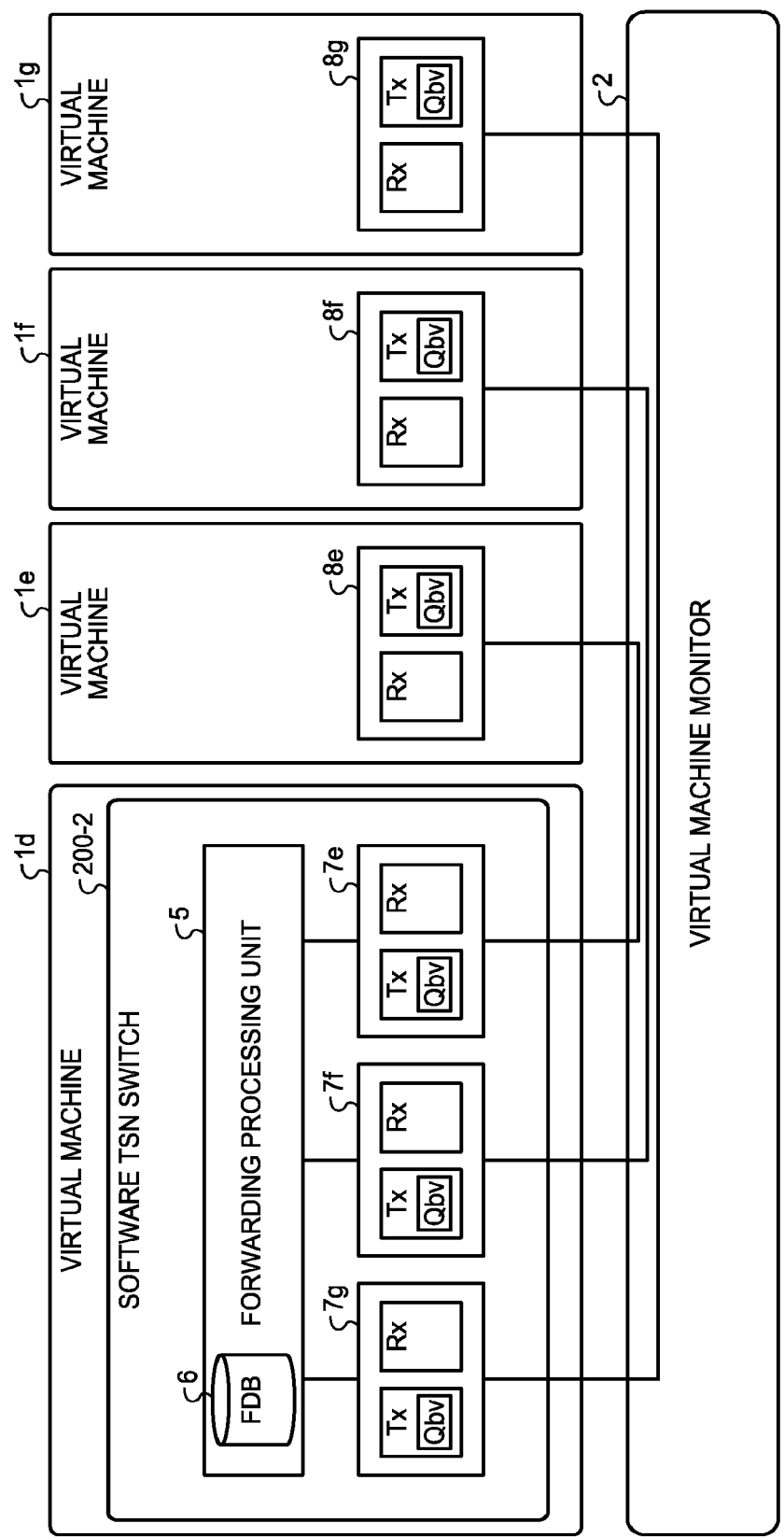
FIG. 3 is a diagram illustrating an example of a Qbv-compatible software TSN switch using a virtual machine.

FIG. 3 is a diagram illustrating an example of a Qbv-compatible software TSN switch 200-2 using a virtual machine 1d. The example of FIG. 3 illustrates a case in which the nodes 31a to 31c of FIG. 2 are consolidated as virtual machines 1e to 1g on one physical machine, and these virtual machines 1e to 1g are connected to a TSN switch (software TSN switch 200-2) implemented by the virtual machine 1d.

In a case where the TSN switch is simply virtualized as illustrated FIG. 3, front-end virtual network drivers 8e to 8g of guest OSs (virtual machines 1e to 1g) and back-end virtual network drivers 7e to 7g of the software TSN switch 200-2 each execute Qbv processing.

In this case, the following two problems occur.
(1) Time synchronization between virtual machines
(2) Guest OS processing overhead First, (1) will be described. In TSN (Qbv), the respective network nodes are synchronized in time, and the synchronized time and schedule information are referenced to control a frame transmission timing. Therefore, also in the configuration of FIG. 3, it is necessary to synchronize times of system clocks or real-time clocks (RTCs) of the virtual machines 1d to 1g. As a synchronization method, a method using the precision time protocol (PTP) as in normal network processing or a method in which a virtual machine monitor or a driver provides a time synchronization function can be considered, but in any case, processing overhead occurs.

Next, (2) will be described. In a case where real-time communication such as TSN is implemented by software, it is preferable to reduce a processing time or fluctuation (jitter) in processing time by using a real time OS (RTOS) or the like. However, as an OS operating on each of the virtual machines 1e to 1g (each network node), a general-purpose OS is used depending on application. In general-purpose OS task scheduling, a complicated control is performed for efficiency in use of a central processing unit (CPU) and power saving. This causes difficulty in estimating the execution time, and the deterministic operation required for real-time processing (real-time communication) cannot be implemented.

As a method for solving the above problem, it is conceivable to concentrate processings related to Qbv in one virtual machine 1d.

Figure 4:
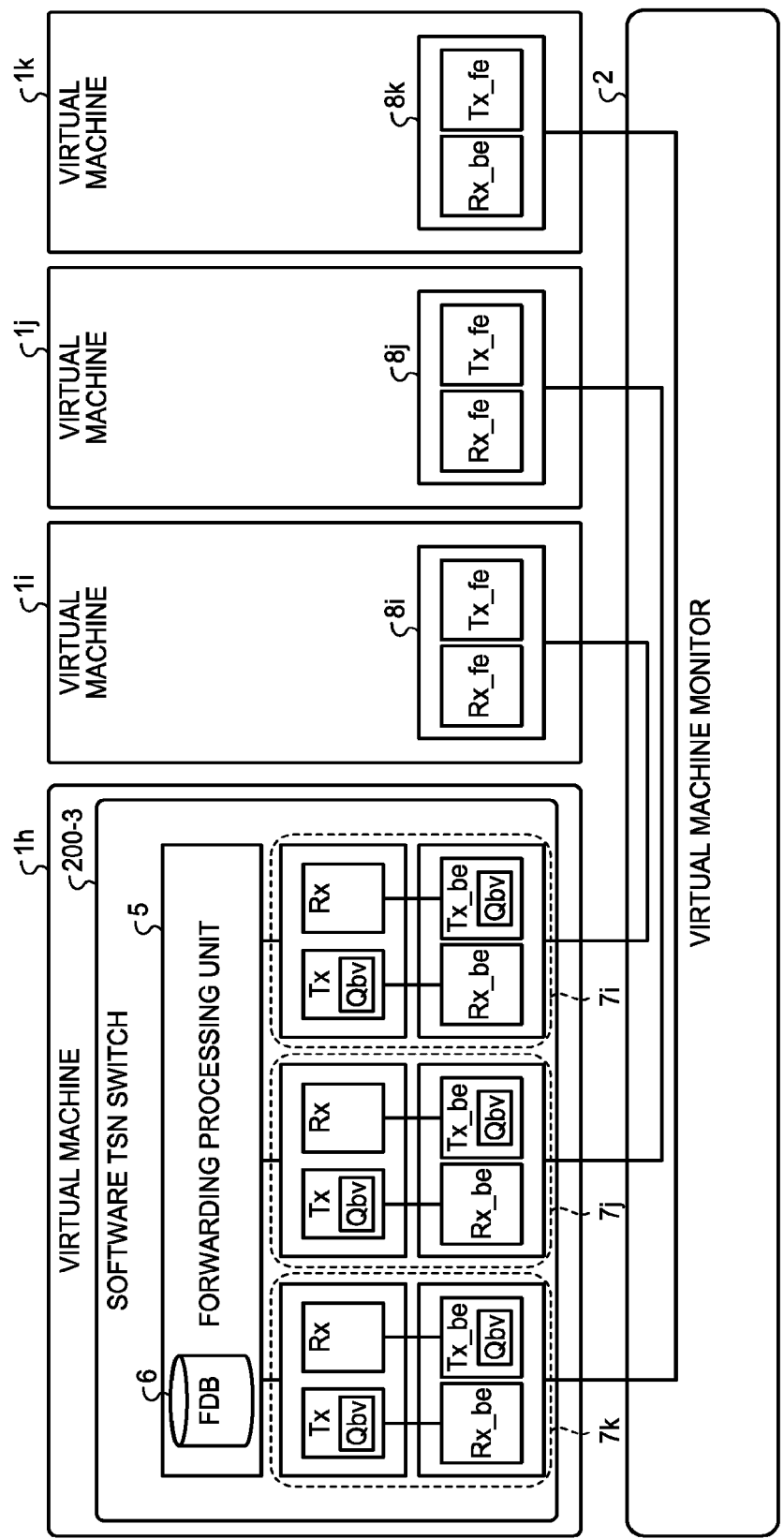
FIG. 4 is a diagram illustrating an example in which processings related to Qbv are concentrated in one virtual machine.

FIG. 4 is a diagram illustrating an example in which processings related to Qbv are concentrated in one virtual machine 1h. In FIG. 4, processing in each of the front-end virtual network drivers 8e to 8g of FIG. 3 is separated into back-end processing units Tx_be and Rx_be related to TSN and other front-end processing units Tx_fe and Rx_fe. A part related to TSN is processed by back-end virtual network drivers 7i to 7k of a software TSN switch 200-3.

Tx_be executes transmission processing including Qbv processing of each of virtual machines 1i to 1k. As processing other than the Qbv processing, IEEE 802.1Qav, Strict Priority (queue priority control), IEEE 802.1CB (redundancy processing), and the like can be considered, but the present invention is not limited thereto.

Rx_be executes reception processing of each of the virtual machines 1i to 1k. In Rx_be, IEEE 802.1Qci (filtering processing), IEEE 802.1CB (redundancy processing), and the like can be executed, but the present invention is not limited thereto.

Tx_fe and Rx_fe execute frame delivery process between each of the virtual machine 1i to 1k and the software TSN switch 200-3.

As described above, with the configuration of FIG. 4, the processings related to TSN are concentrated in one virtual machine 1h (software TSN switch 200-3). As a result, times referenced in the TSN processing can be aggregated into one, and there is no need to perform time synchronization processing between the plurality of virtual machines 1i to 1k as illustrated FIG. 3. Further, even in a case of using a general-purpose OS on each of the virtual machines 1i to 1k, a part related to the TSN processing is not affected by task scheduling of the general-purpose OS.

Description about Data Delivery Between Virtual Machines

Figure 5:
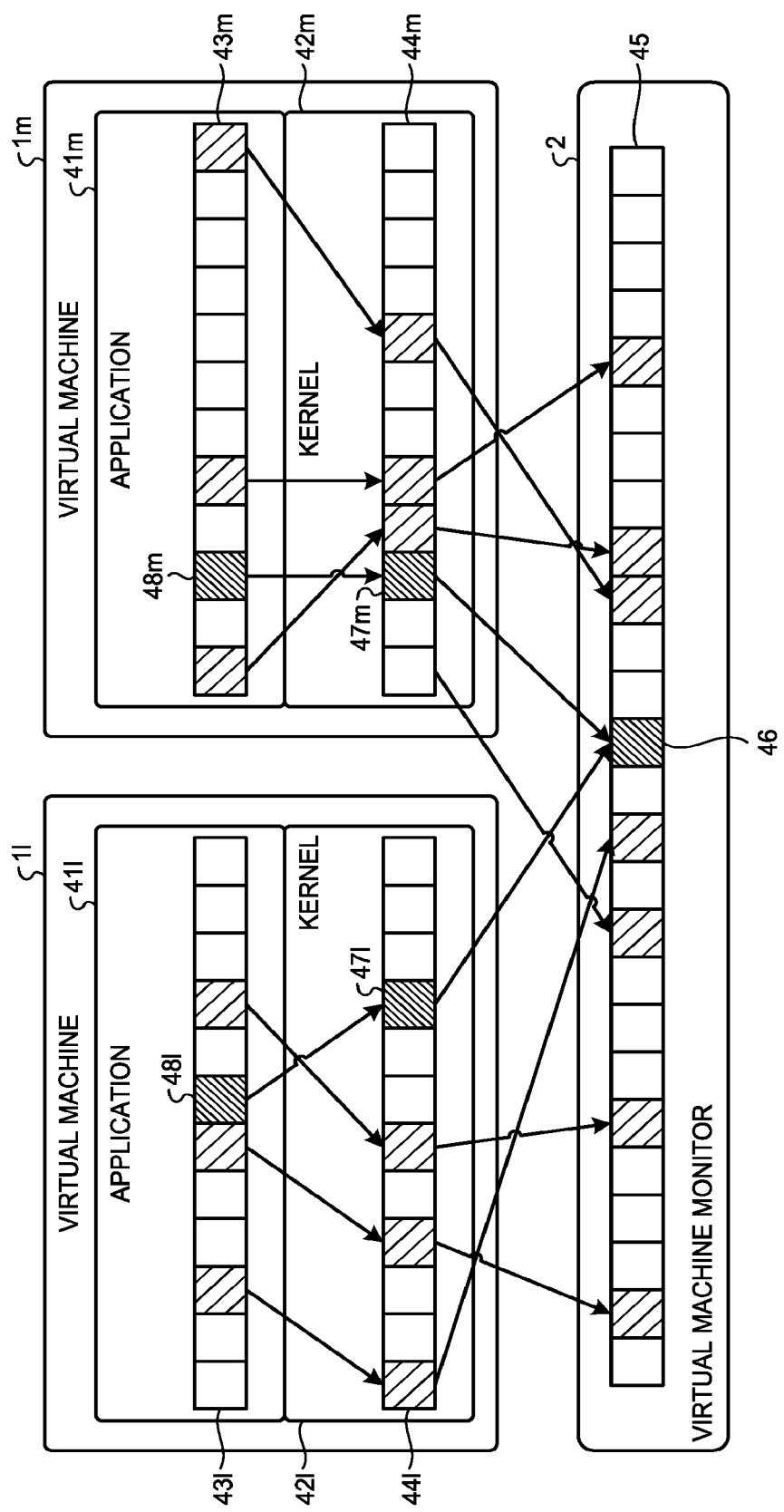
FIG. 5 is a diagram for describing data delivery between virtual machines.

FIG. 5 is a diagram for describing data delivery between virtual machines 1l and 1m.

The virtual machine 1l includes an application 41l and a kernel 42l. In the application 41l, data storage control is performed by a virtual memory 43l. In the kernel 42l, data storage control is performed by a pseudo-physical memory 44l. Similarly, in an application 41m, data storage control is performed by a virtual memory 43m. In a kernel 42m, data storage control is performed by a pseudo-physical memory 44m.

Hereinafter, when the virtual machines 1l and 1m need not be distinguished, the virtual machines 1l and 1m will be simply referred to as virtual machine 1. Similarly, when the virtual memories 43l and 43m need not be distinguished, the virtual memories 43l and 43m will be simply referred to as virtual memory 43. Similarly, when the pseudo-physical memories 44l and 44m need not be distinguished, pseudo-physical memories 44l and 44m will be simply referred to as pseudo-physical memory 44.

From the viewpoint of security and the like, functions provided to the guest OS (virtual machine 1) are limited so that each virtual machine 1 cannot directly access resources managed by other virtual machines 1. For example, the virtual machine monitor 2 executes processing such as access to a physical memory 45, a control of hardware such as NICs and storage devices, and issuance of privileged instructions. The virtual machine 1 issues a command such as a hypercall or VMExit, such that the virtual machine monitor 2 executes processing according to the hypercall or VMExit (hereinafter, a description will be made using the hypercall).

Data delivery between the virtual machines 1 is implemented by issuing the hypercall described above. The example of FIG. 5 illustrates an example of data delivery performed in a manner in which the plurality of virtual machines 1l and 1m share the same physical memory area 46. Each virtual machine 1 can directly access the virtual memory 43 and the pseudo-physical memory 44, and manages mapping information (correspondence) between the virtual memory 43 and the pseudo-physical memory 44. The virtual machine monitor 2 manages mapping information of the physical memory (machine memory) 45 and the pseudo-physical memory 44.

The memory mapping information is managed in page units (size such as 4 KB or 64 KB). Conversion between a virtual memory address or a pseudo-physical address, and a physical address is performed by a memory management unit (MMU), thereby enabling access to the physical memory based on the virtual memory address or the pseudo-physical address. In general, one area (page) of the physical memory 45 is mapped to the virtual memory 43 and the pseudo-physical memory 44 on a one-to-one basis.

As one of methods for delivering data between the virtual machines 1, there is a method of allowing a plurality of virtual machines 1 to access the same physical memory 45, like the physical memory area 46. An example of an operation of associating a pseudo-physical memory area 47l (virtual memory area 48l) of the virtual machine 1l and a pseudo-physical memory area 47m (virtual memory area 48m) of the virtual machine 1m with the same physical memory area 46 will be described (note that the operation is not limited thereto).

The virtual machine 1l issues a hypercall (setup) that instructs memory mapping, and makes a notification to the virtual machine monitor 2 so that the virtual machine 1m can perform mapping to the pseudo-physical memory area 47l. Information to be notified includes an address of the pseudo-physical memory area 47l, information of the virtual machine (the virtual machine 1m in FIG. 5) that is permitted to perform mapping, access restriction (read only, read/write, or the like), or the like.

The virtual machine monitor 2 receives the hypercall, allows the virtual machine 1m to perform mapping to the physical memory area 46 mapped to the pseudo-physical memory area 47l, and returns an identifier of corresponding memory mapping information to the virtual machine 1l. The virtual machine 1l notifies the virtual machine 1m of the identifier received using a control interface provided by the virtual machine monitor 2, or the like.

The virtual machine 1m issues a hypercall (map) to instruct the virtual machine monitor 2 to map the pseudo-physical memory area 47l and the pseudo-physical memory area 47m to each other. Information to be notified includes an address of the pseudo-physical memory area 47m, the identifier notified from the virtual machine 1l, information on a virtual machine as a mapping destination, or the like. The virtual machine monitor 2 specifies the physical memory address area 46 based on the notified identifier and maps the pseudo-physical memory area 47m.

To deliver data from the virtual machine 1*l* to the virtual machine 1*m*, the virtual machine 1*l* maps a page (the virtual memory area 48*l* or the pseudo-physical memory area 47*l*) in which data is written to a page of the virtual machine 1*m*, such that the virtual machine 1*m* can refer to the data. After the data delivery is completed (the virtual machine 1*m* reads the data), the virtual machine 1*m* issues a hypercall (unmap) to unmap the pseudo-physical memory area 47*m* and the physical memory 46.

The above-described processing is data delivery processing using the mapping of the same physical memory area 46.

In addition to the mapping to the same physical memory area 46, the method for delivering data also includes a method such as a copy method or a transfer method. In the copy method, data are copied between physical memory areas referenced by two virtual memory areas (pseudo-physical memory areas) designated by the virtual machine monitor 2. In the transfer method, mapping between two physical memory areas referenced by two virtual memory areas (pseudo-physical memory areas) designated by the virtual machine monitor 2 is replaced. Since the physical memory 45 is controlled in both the copy method and the transfer method, the virtual machine 1 needs to issue a hypercall to the virtual machine monitor 2.

Description of Operation of Software TSN Switch

An operation of the software TSN switch 200-3 in a case of using data delivery by the mapping of the same physical memory area 46 will be described. In the following description, the software TSN switch 200-3 will be referred to as frame transfer unit 200-3.

Figure 6:
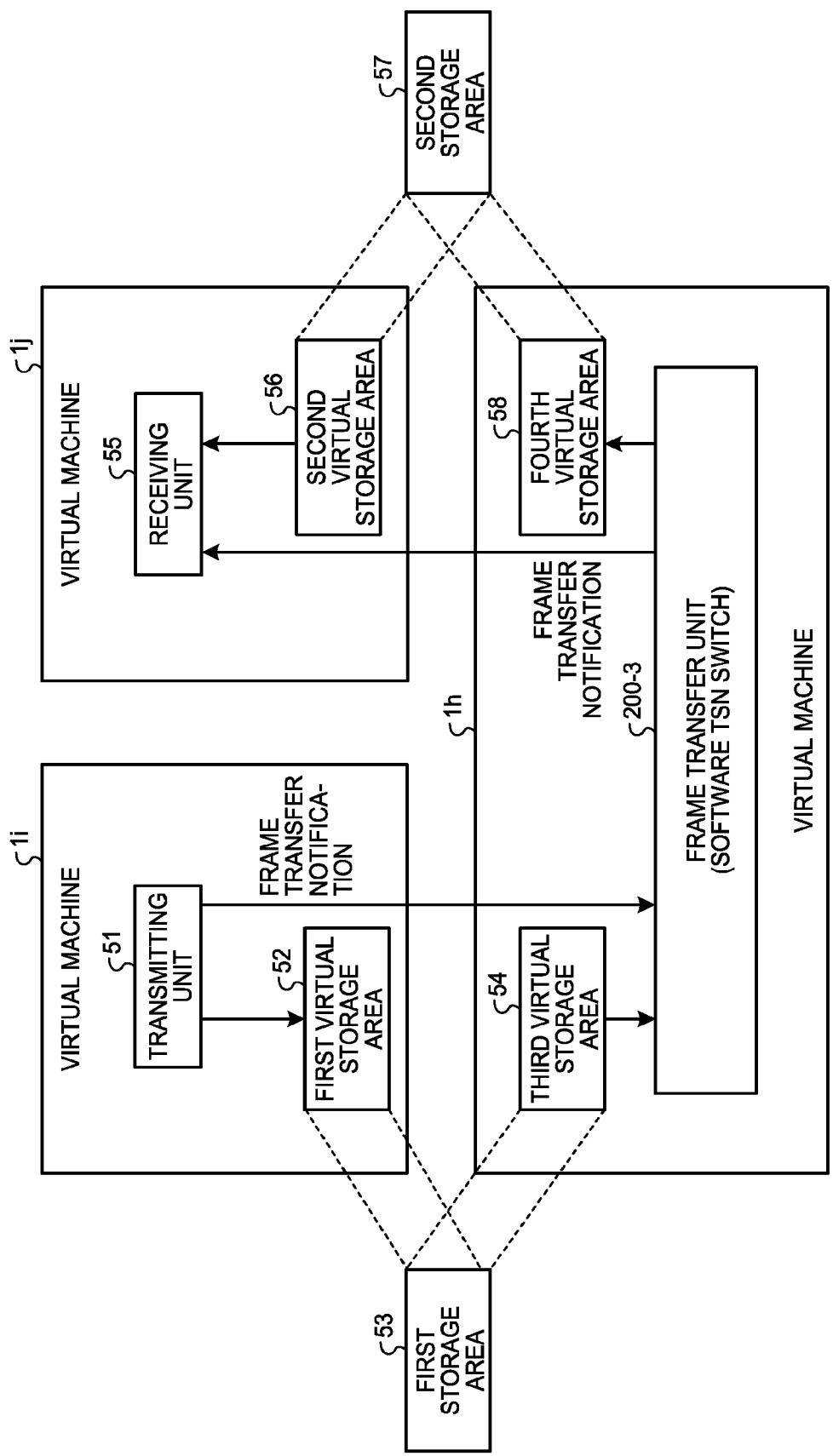
FIG. 6 is a diagram for describing an example of an operation of the software TSN switch.

FIG. 6 is a diagram for describing an example of an operation of the software TSN switch 200-3. The frame transfer unit 200-3 operates on a virtual machine 1*h*, but may also be implemented by the virtual machine monitor 2 instead of the virtual machine 1*h*. In the example of FIG. 6, a frame is transferred from the virtual machine 1*i* to the virtual machine 1*j*.

The virtual machine 1*i* includes a transmitting unit 51 (Tx_fe of a front-end virtual network driver 8*i*) that executes frame transmission processing, and a first virtual storage area 52.

The transmitting unit 51 writes the frame in the first virtual storage area 52 and makes a notification to the frame transfer unit 200-3. The first virtual storage area 52 is a part of a pseudo-physical memory or virtual memory managed by the virtual machine 1*i*. The first virtual storage area 52 is used as a transmission buffer for the frame transfer unit 200-3.

The virtual machine 1*j* includes a receiving unit 55 (Rx_fe of a front-end virtual network driver 8*j*) that executes frame reception processing, and a second virtual storage area 56. The receiving unit 55 receives a frame transfer notification from the frame transfer unit 200-3 and reads the frame from the second virtual storage area 56. The second virtual storage area 56 is a part of a pseudo-physical memory or virtual memory managed by the virtual machine 1*j*. The second virtual storage area 56 is used as a reception buffer from the frame transfer unit 200-3.

The virtual machine 1*h* includes the frame transfer unit 200-3, a third virtual storage area 54, and a fourth virtual storage area 58. The third virtual storage area 54 and the fourth virtual storage area 58 are each a part of a pseudo-physical memory or virtual memory managed by the virtual machine 1*h*. The third virtual storage area 54 is used as a reception buffer for the virtual machine 1*i*. The fourth virtual storage area 58 is used as a transmission buffer for the virtual machine 1*j*. The frame transfer unit 200-3 executes frame transfer process between the virtual machines 1.

A first storage area 53 and a second storage area 57 are each a part of the physical memory 45 managed by the virtual machine monitor 2.

Hereinafter, details of an operation when transferring a frame from the virtual machine 1*i* to the virtual machine 1*j* will be described.

First, an operation of the transmitting unit 51 will be described. First, the transmitting unit 51 writes a frame received from an application or network stack in the first virtual storage area 52. Next, the transmitting unit 51 issues a hypercall (setup) so that the virtual machine 1*h* can also perform mapping to the first storage area 53 referenced by the first virtual storage area 52. Next, the transmitting unit 51 issues a frame transfer notification to the frame transfer unit 200-3.

Through the frame transfer notification, mapping information of the first storage area 53 that is acquired as transferred frame information with the hypercall, or the like is notified. Finally, when a transfer completion notification is received from the frame transfer unit 200-3, the transmitting unit 51 performs release of a transmission buffer, or the like, and ends the frame transfer processing.

Next, an operation of the receiving unit 55 will be described. The receiving unit 55 issues a hypercall (setup) in advance so that the virtual machine 1*h* can also perform mapping to the second storage area 57 to which a free reception buffer (second virtual storage area 56) is mapped. When the frame transfer notification is received from the frame transfer unit 200-3, the receiving unit 55 specifies a reception buffer in which the frame is written from information received through the frame transfer notification. The receiving unit 55 delivers the frame from the specified reception buffer to the application or network stack. The receiving unit 55 finally releases the reception buffer so that the virtual machine 1*h* can perform mapping to the reception buffer that has become a free area.

Finally, an operation of the frame transfer unit 200-3 will be described. When the frame transfer notification is received from the transmitting unit 51, the frame transfer unit 200-3 executes transfer processing. First, the frame transfer unit 200-3 issues a hypercall (map) to map the first storage area 53 notified through the mapping information to the reception buffer (the third virtual storage area 54 in the example of FIG. 6).

The frame transfer unit 200-3 reads the frame from the third virtual storage area 54 (first storage area 53) and determines a destination by referring to frame header information and the FDB 6 (in the example of FIG. 6, the virtual machine 1*j* is the destination). The frame transfer unit 200-3 copies the frame to a transmission buffer (in the example of FIG. 6, the transmission buffer is the fourth virtual storage area 58 and is assumed as being mapped to the second storage area 57 by issuance of the hypercall (map) performed in advance) for the destination virtual machine, and issues the frame transfer notification to the receiving unit 55 of the virtual machine 1*j*. Once the copy is completed, the frame transfer unit 200-3 issues a hypercall (unmap) to release the mapping between the third virtual storage area 54 and the first storage area 53, and issues the transfer completion notification to the transmitting unit 51 of the virtual machine 1*i*. Further, when the transmission to the virtual machine 1*j* is completed, the frame transfer unit 200-3 issues a hypercall (unmap) to release the mapping between the fourth virtual storage area 58 and the second storage area 57.

The above-described processing is processing for the frame transfer from the virtual machine 1*i* to the virtual machine 1*j*. In the above example, the virtual machines 1*i* and 1*j* issue the hypercall (setup) and the virtual machine 1*h* issues the hypercall (map/unmap), but the opposite may also be possible.

Further, in the above example, mapping/unmapping is performed each time a frame is transferred, but a configuration in which an area mapped at the time of starting is reused may also be applicable.

Further, although the hypercall (map) is used for data delivery in the above example, copy (hypercall (copy)) or transfer (hypercall (Transfer)) may also be used.

In the example of FIG. 6, data copy is performed once and issuance of a hypercall is performed five times as follows.
  Data copy: once
  Data copy from third virtual storage area 54 (first storage area 53) to fourth virtual storage area 58 (second storage area 57)
  Hypercall: six times
  Setup (change of access authority or the like) of first virtual storage area 52 (first storage area 53)
  Mapping between first storage area 53 and third virtual storage area 54
  Unmapping of first storage area 53 and third virtual storage area 54
  Setup (change of access authority or the like) of second virtual storage area 56 (second storage area 57)
  Mapping between second storage area 57 and fourth virtual storage area 58
  Unmapping of second storage area 57 and fourth virtual storage area 58

Generally, data copy between memories or a hypercall (switching between the virtual machine 1 and the virtual machine monitor 2) requires a long processing time. In addition, fluctuation (jitter) in processing time is also large. In a case of the data copy, it is difficult to estimate the processing time due to contention in memory access. In a case of the hypercall, it is difficult to estimate the processing time due to issuance of privileged instructions or an influence of a scheduler of the virtual machine monitor.

In view of the above problems, it is preferable to reduce the numbers of times data copy and hypercall are performed as much as possible. As one means for reducing the numbers of times data copy and hypercall are performed, a method of using a dedicated network for each pair of a transmission-side virtual machine 1*n* and 1*o* and a reception-side virtual machine 1*p* and 1*q* without using the switch as illustrated in FIG. 7 can be considered.

Figure 7:
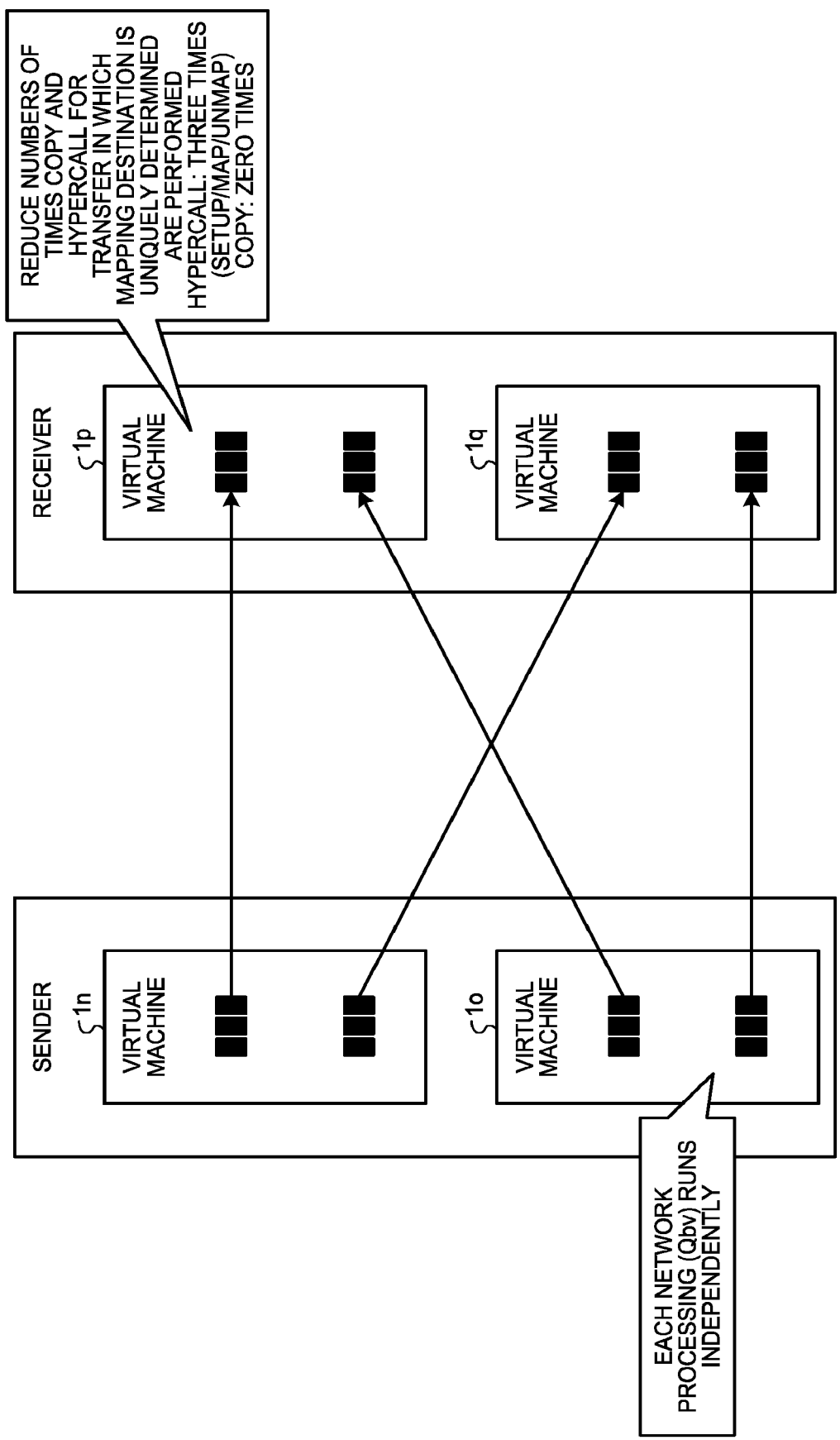
FIG. 7 is a diagram illustrating an example in which virtual machines are connected by a dedicated network.

In the case of FIG. 7, since a correspondence between a transmission buffer of the transmission-side virtual machine 1 and a reception buffer of the reception-side virtual machine 1 is uniquely determined (a mapping destination is uniquely determined), the numbers of times copy and hypercall for transfer are performed can be reduced. Specifically, data copy is not performed, and issuance of a hypercall is performed three times (setup/map/unmap for the transmission buffer and the reception buffer).

However, FIG. 7 poses a problem in real-time communication processing such as TSN. In FIG. 7, processing of each dedicated network is independent. As described above, in TSN, each network node needs to operate in time synchronization. For example, it is assumed that the virtual machine 1*n* and the virtual machine 1*o* each transmit a frame to the virtual machine 1*p*. In a case where the Qbv processing is executed correctly, frames arrive at the virtual machine 1*p* in an order specified by the scheduling in advance. However, in a case where each network operate independently as illustrated FIG. 7, the frame arrival order cannot be guaranteed.

First Embodiment

Against such a background, in a first embodiment, transfer of data related to frame transfer and transfer of control information (descriptor) are separated. Specifically, the data transfer is performed by mapping a transmission buffer of a transmission-side virtual machine 1 and a reception buffer of a reception-side virtual machine 1 as illustrated FIG. 7, and the control information transfer is performed via the frame transfer unit 200-3 (corresponding to a transfer control unit in the first embodiment) as illustrated in FIG. 6. As a result, the numbers of times data copy and hypercall are performed are reduced while correctly controlling a timing for frame transfer required for real-time communication such as TSN.

Example of Functional Configuration

Figure 8:
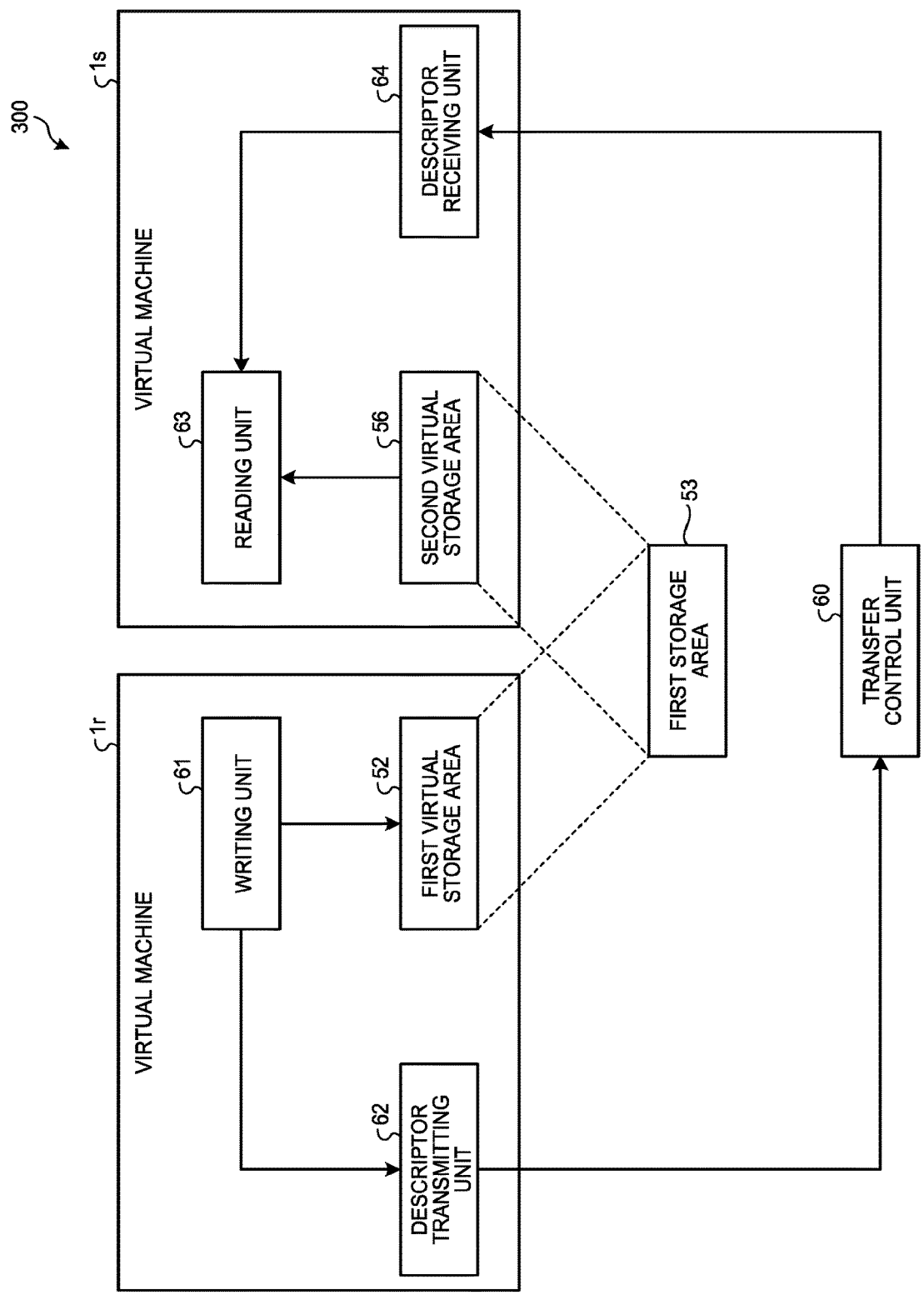
FIG. 8 is a diagram illustrating an example of a functional configuration of a communication apparatus according to a first embodiment.

FIG. 8 is a diagram illustrating an example of a functional configuration of a communication apparatus 300 according to the first embodiment. The communication apparatus 300 according to the first embodiment includes a virtual machine 1*r*, a virtual machine 1*s*, a first storage area 53, and a transfer control unit 60. In the example of FIG. 8, two virtual machines 1*r* and is are connected to the transfer control unit 60 (switch).

The virtual machine 1*r* includes a writing unit 61, a first virtual storage area 52, and a descriptor transmitting unit 62.

The writing unit 61 writes a frame in the first virtual storage area 52 and makes a notification to the descriptor transmitting unit 62.

The first virtual storage area 52 is a part of a pseudo-physical memory or virtual memory managed by the virtual machine 1*r*. The first virtual storage area 52 is used as a transmission buffer that stores a frame corresponding to a descriptor transmitted from the transfer control unit 60.

The descriptor transmitting unit 62 transmits a descriptor of a frame to the transfer control unit 60.

The virtual machine 1*s* includes a reading unit 63, a second virtual storage area 56, and a descriptor receiving unit 64.

The descriptor receiving unit 64 receives a descriptor from the transfer control unit 60.

Once a notification is received from the descriptor receiving unit 64, the reading unit 63 reads a frame from the second virtual storage area 56. Specifically, when the descriptor is received by the descriptor receiving unit 64, the reading unit 63 reads the frame from the second virtual storage area 56 specified based on the descriptor. More specifically, the reading unit 63 maps the second virtual storage area 56 to the first storage area 53 based on the descriptor, and reads the frame from the second virtual storage area 56.

The second virtual storage area 56 is a part of a pseudo-physical memory or virtual memory managed by the virtual machine 1*s*. The second virtual storage area 56 is used as a reception buffer that stores a frame corresponding to a descriptor transmitted from the transfer control unit 60.

The transfer control unit 60 controls a timing for transferring a descriptor of a frame based on schedule information. The schedule information is defined based on, for example, IEEE 802.1Qbv. The transfer control unit 60 refers to a descriptor received from the descriptor transmitting unit 62 to determine a transfer destination, and delivers the descriptor to the descriptor receiving unit 64 of a destination virtual machine 1. In the example of FIG. 8, the transfer control unit 60 transfers the descriptor from the virtual machine 1*r* to the virtual machine 1*s*.

The transfer control unit 60 may operate on the virtual machine 1 or the virtual machine monitor 2. Further, the transfer control unit 60 may operate by hardware (coprocessor or dedicated hardware) other than a CPU on which the virtual machine 1 or the virtual machine monitor 2 operates.

The first storage area 53 is a part (physical memory area 46) of the physical memory 45 managed by the virtual machine monitor 2.

Next, an example of a communication method according to the first embodiment will be described. In the examples of FIGS. 9 to 13, details of an operation when transferring a frame from the virtual machine 1*r* to the virtual machine 1*s* of FIG. 8 will be described. First, an operation of the writing unit 61 will be described.

Figure 9:
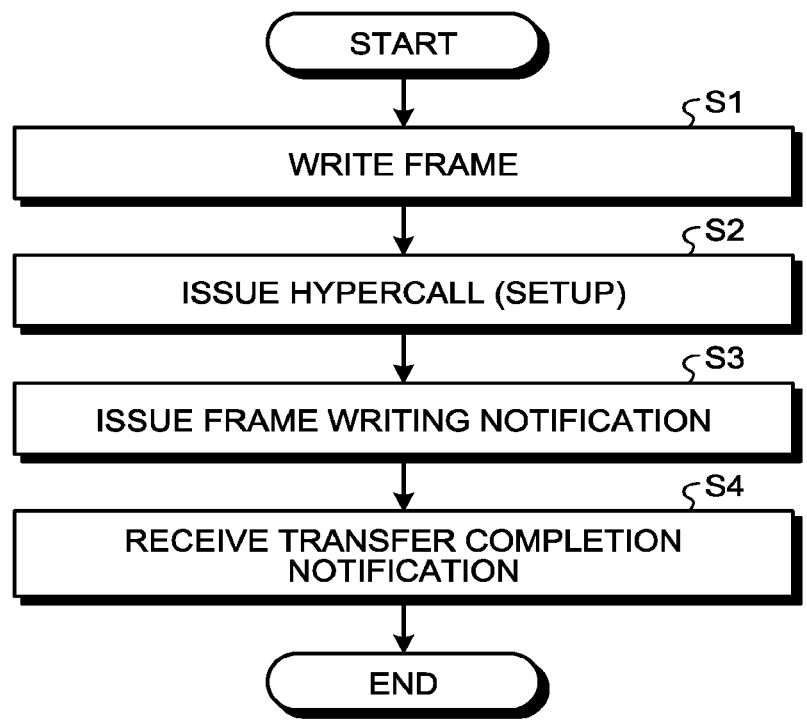
FIG. 9 is a flowchart illustrating an example of an operation of a writing unit according to the first embodiment.

FIG. 9 is a flowchart illustrating an example of the operation of the writing unit 61 according to the first embodiment.

First, the writing unit 61 writes a frame received from the application or network stack in the first virtual storage area 52 (Step S1).

Next, the writing unit 61 issues a hypercall (setup) so that the virtual machine 1*s* can also perform mapping to the first storage area 53 referenced by the first virtual storage area 52 (Step S2).

Next, the writing unit 61 issues a frame writing notification to the descriptor transmitting unit 62 (Step S3). Through the frame writing notification, for example, mapping information of the first storage area 53 that is acquired as transferred frame information with the hypercall is notified.

Finally, when a transfer completion notification is received from the descriptor transmitting unit 62, the writing unit 61 releases a transmission buffer (first virtual storage area 52) or the like, and ends the frame transfer processing. Note that the descriptor transmitting unit 62 may perform the release of the transmission buffer or the like.

Next, an operation of the descriptor transmitting unit 62 will be described.

Figure 10:
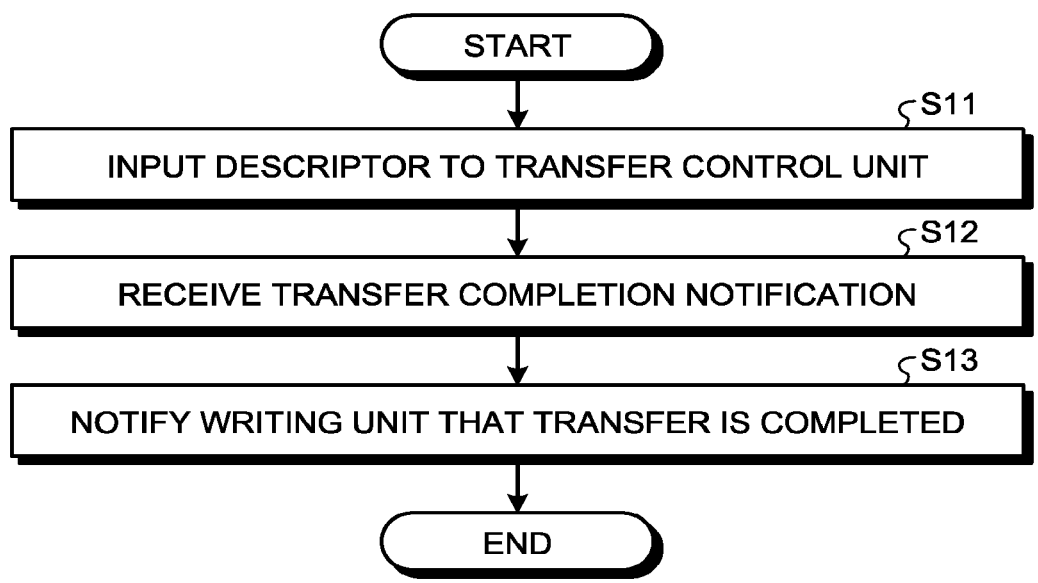
FIG. 10 is a flowchart illustrating an example of an operation of a descriptor transmitting unit according to the first embodiment.

FIG. 10 is a flowchart illustrating an example of the operation of the descriptor transmitting unit 62 according to the first embodiment. First, when the frame writing notification is received from the writing unit 61, the descriptor transmitting unit 62 inputs a descriptor to the transfer control unit 60 (Step S11). The descriptor includes mapping information received from the writing unit 61, information of the transfer destination virtual machine 1*s*, or the like. In the first embodiment, the mapping information includes information that specifies the first storage area 53 mapped to the first virtual storage area 52 in which the frame is stored.

A method of delivering the descriptor may be implemented using, for example, a control interface prepared in advance. It is conceivable that the control interface is implemented by performing mapping to the same physical memory area 45 between the virtual machine 1*r* (descriptor transmitting unit 62) and the transfer control unit 60 in advance and using a ring buffer or the like. As an example, a device I/O ring of Xen (registered trademark) is used. Further, for example, in the method of delivering the descriptor, a function of the control interface provided by the virtual machine monitor 2 may be used. These methods of delivering the descriptor are examples, and the present invention is not limited thereto.

Finally, when a transfer completion notification is received from the transfer control unit 60 (Step S12), the descriptor transmitting unit 62 notifies the writing unit 61 that the transfer is completed (Step S13).

Next, an operation of the transfer control unit will be described.

Figure 11:
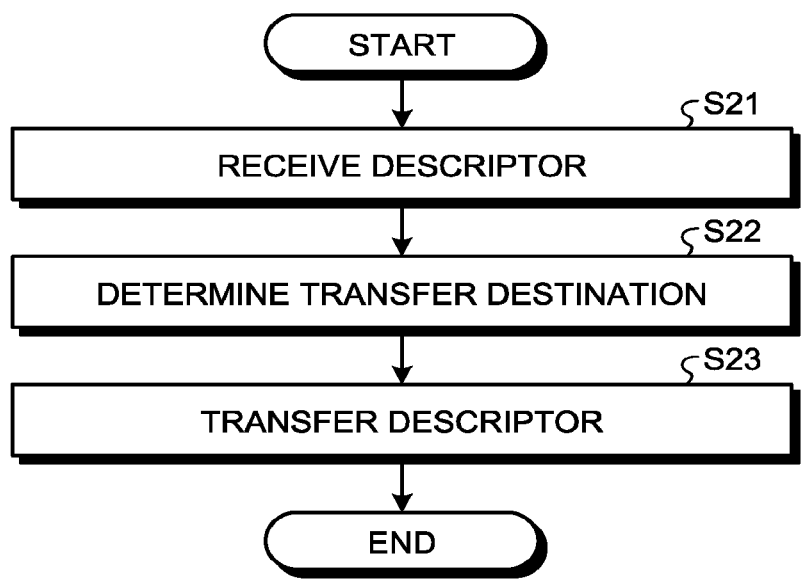
FIG. 11 is a flowchart illustrating an example of an operation of a transfer control unit according to the first embodiment.

FIG. 11 is a flowchart illustrating an example of the operation of the transfer control unit 60 according to the first embodiment. First, when a descriptor is received from the descriptor transmitting unit 62 (Step S21), the transfer control unit 60 determines a transfer destination virtual machine 1 (the virtual machine 1*s* in the example of FIG. 8) (Step S22).

Next, the transfer control unit 60 transfers the descriptor to the descriptor receiving unit 64 of the transfer destination virtual machine 1*s* (Step S23). The transfer control unit 60 controls a descriptor transfer timing (execution timing of Step S23) in a case of supporting real-time communication processing such as TSN. For example, in s case of IEEE 802.1Qbv, the transfer control unit 60 determines the descriptor transfer timing by referring to the gate control list and a current time.

Next, an operation of the descriptor receiving unit 64 will be described.

Figure 12:
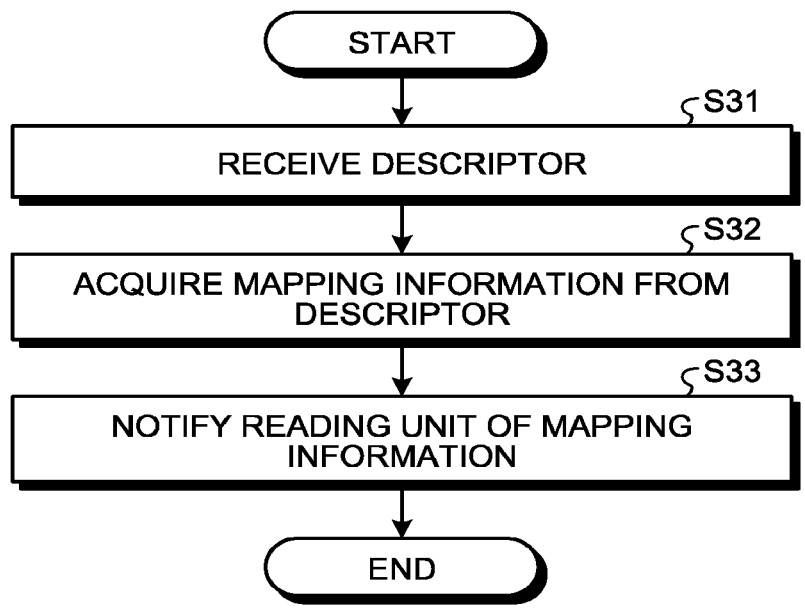
FIG. 12 is a flowchart illustrating an example of an operation of a descriptor receiving unit according to the first embodiment.

FIG. 12 is a flowchart illustrating an example of the operation of the descriptor receiving unit 64 according to the first embodiment. First, when a descriptor is received from the transfer control unit 60 (Step S31), the descriptor receiving unit 64 acquires, from the descriptor, mapping information of a storage area in which a frame is stored (Step S32), and notifies the reading unit 63 of the mapping information (Step S33). Note that a method of delivering the descriptor from the transfer control unit 60 to the descriptor receiving unit 64 is the same as that of the descriptor transmitting unit 62.

Next, an operation of the reading unit 63 will be described.

Figure 13:
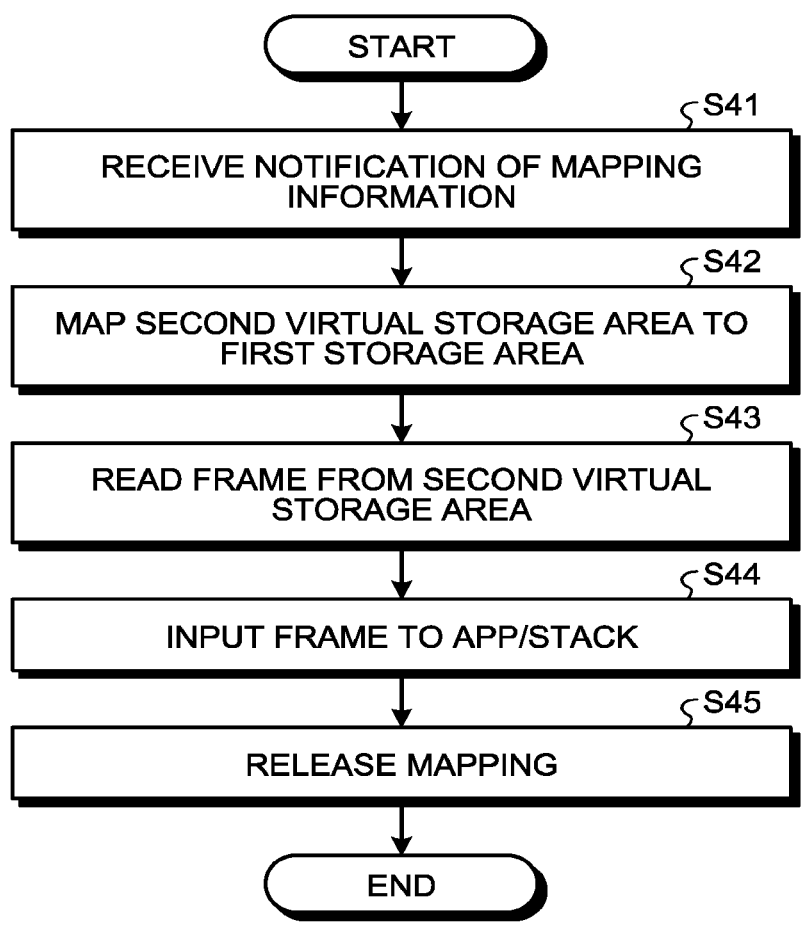
FIG. 13 is a flowchart illustrating an example of an operation of a reading unit according to the first embodiment.

FIG. 13 is a flowchart illustrating an example of the operation of the reading unit 63 according to the first embodiment. First, when the notification of the mapping information is received from the descriptor receiving unit 64 (Step S41), the reading unit 63 issues a hypercall (map) to map the second virtual storage area 56 to the first storage area 53 in which a transfer target frame is stored (Step S42).

Next, the reading unit 63 reads the transfer target frame from the second virtual storage area 56 mapped by the processing of Step S42 (Step S43). Next, the reading unit 63 inputs the frame read by the processing of Step S43 to the application or network stack (Step S44). Finally, the reading unit 63 issues a hypercall (unmap) to release the mapping between the first storage area 53 and the second virtual storage area 56 (Step S45).

As described above, in the communication apparatus 300 according to the first embodiment, the writing unit 61 writes a frame in the first virtual storage area 52. The transfer control unit 60 controls a timing for transferring a descriptor of a frame based on schedule information. The descriptor receiving unit 64 receives a descriptor. Further, when the descriptor is received by the descriptor receiving unit 64, the reading unit 63 reads a frame from the second virtual storage area 56 specified based on the descriptor.

As a result, with the communication apparatus 300 according to the first embodiment, it is possible to suppress a delay in transfer processing required for real-time communication.

Specifically, with the communication apparatus 300 according to the first embodiment, the transfer of data (transfer target frame) related to frame transfer and the transfer of control information (descriptor) are separated, and thus it is possible to reduce the numbers of times data copy and issuance of hypercall are performed, while correctly controlling a timing for frame transfer required for real-time communication such as TSN. For example, in the example of FIG. 8, the numbers of times data copy is performed is reduced to zero times, and the number of times issuance of a hypercall is performed is reduced to three times.

Data copy: zero times

Hypercall: three times

Setup (change of access authority or the like) of first virtual storage area 52 (first storage area 53)

Mapping between first storage area 53 and second virtual storage area 56

Unmapping of first storage area 53 and second virtual storage area 56

In the example of FIG. 8, the hypercall is issued each time a frame is transmitted. However, the first virtual storage area 52 and the second virtual storage area 56 may be mapped to the first storage area 53 in advance, for example, when the communication apparatus 300 is initialized, and may be reused as a buffer. In this case, the descriptor includes information that specifies the first storage area 53 in which the frame is stored. For example, in a case where the ring buffer is used to manage a start address (Head) of a free area and a start address (Tail) where the frame is written, the writing unit 61 and the reading unit 63 can simultaneously perform writing and reading in and from the first storage area 53, respectively. In this case, it is sufficient that the hypercall is issued at the time of initialization or the like, and it is not necessary to issue the hypercall during the frame transfer processing.

Further, in the example of FIG. 8, a case in which there are two virtual machines 1 connected to the transfer control unit 60 (software TSN switch) has been described, but the number of virtual machines 1 may be arbitrary. Further, in the example of FIG. 8, the virtual machine 1r includes a transmission processing unit (writing unit 61 and descriptor transmitting unit 62), and the virtual machine 1s includes a reception processing unit (reading unit 63 and descriptor receiving unit 64). However, each virtual machine 1 may include both a transmission processing unit and a reception processing unit.

Second Embodiment

Next, a second embodiment will be described. In a description of the second embodiment, a description of the same content as that of the first embodiment is omitted, and only differences from the first embodiment will be described.

In the first embodiment, the method of delivering data between the virtual machines 1 by using a method of sharing the same physical memory area 45 among a plurality virtual machines 1 has been described (hypercall (map)). In the second embodiment, a method in which the virtual machine monitor 2 copies data in the physical memory area 45 by a hypercall (copy) as illustrated FIG. 14 is used.

Figure 14:
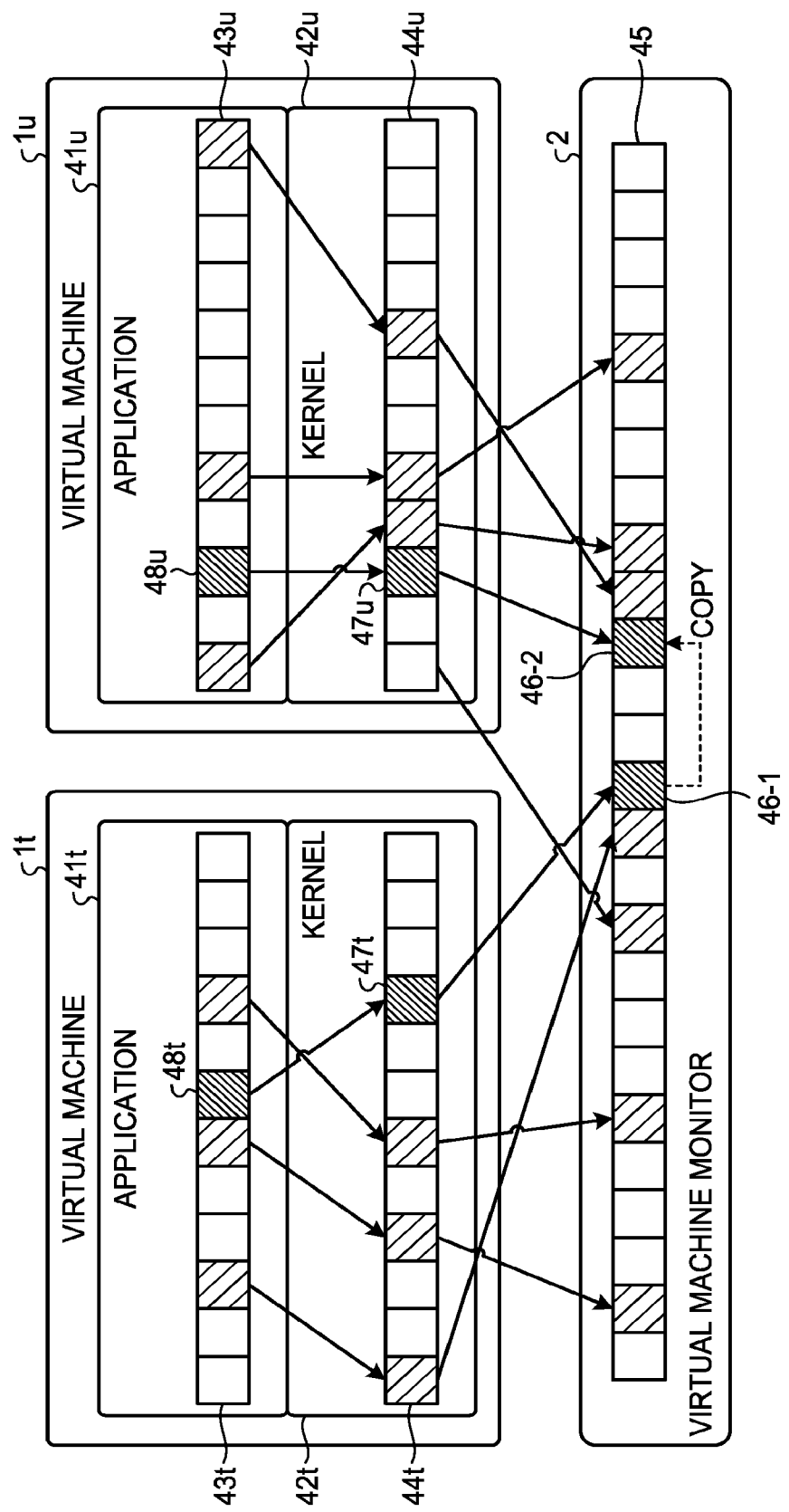
FIG. 14 is a diagram for describing data delivery between virtual machines according to a second embodiment.

FIG. 14 is a diagram for describing data delivery between virtual machines 1t and 1u according to the second embodiment.

In general, from the viewpoint of security, each virtual machine 1 cannot directly access other than a memory area managed by itself. Meanwhile, since the virtual machine monitor 2 has a memory management function, the virtual machine monitor 2 can access all physical memory areas 45. Therefore, the virtual machine monitor 2 provides a function of performing data copy between a plurality of physical memories, and each virtual machine 1 issues a hypercall (copy) to use the function, such that it is possible to deliver data between the virtual machines 1.

Example of Functional Configuration

Figure 15:
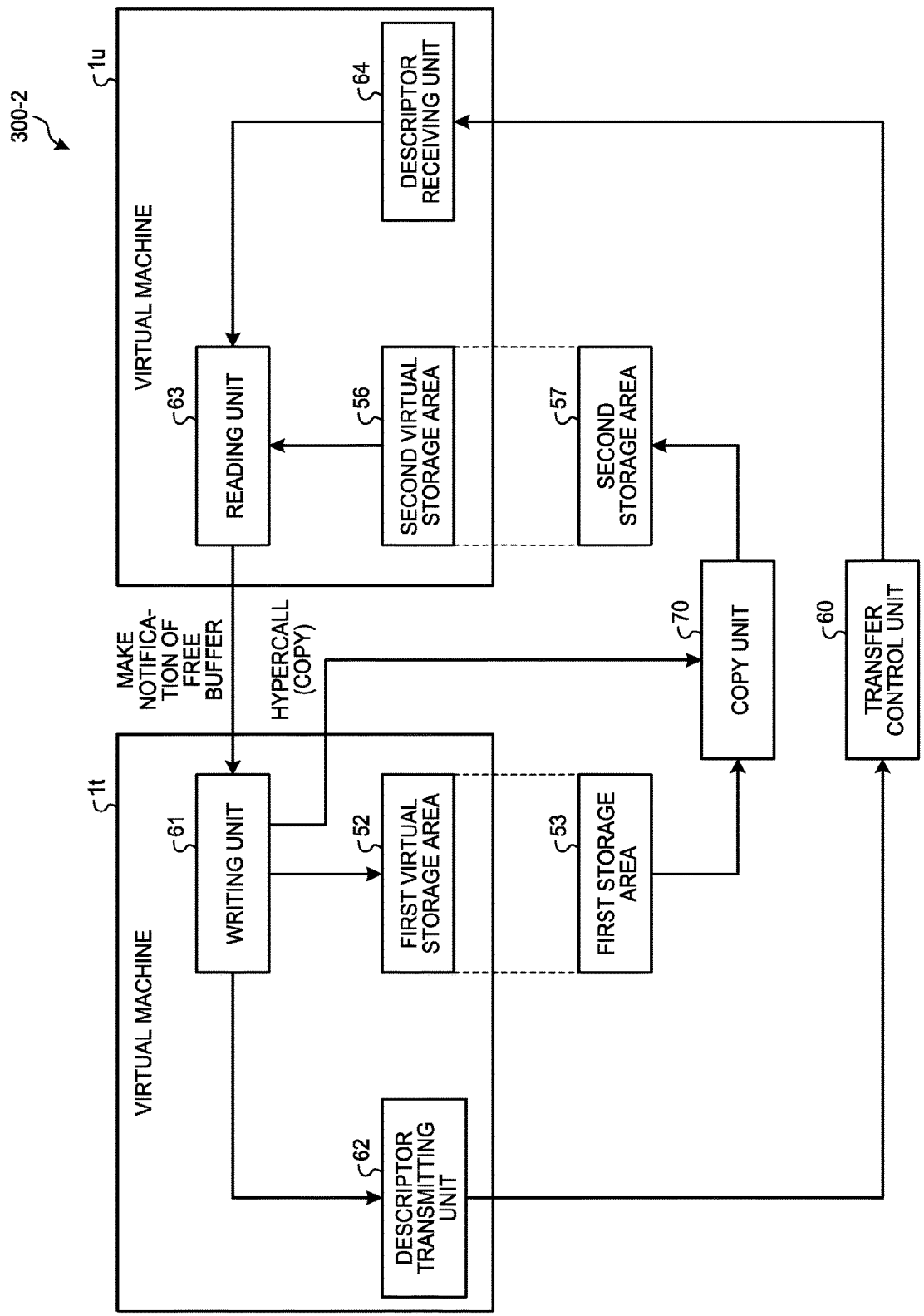
FIG. 15 is a diagram illustrating an example of a functional configuration of a communication apparatus according to the second embodiment.

FIG. 15 is a diagram illustrating an example of a functional configuration of a communication apparatus 300-2 according to the second embodiment. The communication apparatus 300-2 according to the second embodiment includes the virtual machine 1t, the virtual machine 1u, a first storage area 53, a second storage area 57, a transfer control unit 60, and a copy unit 70. In the example of FIG. 15, two virtual machines 1t and 1u are connected to the transfer control unit 60 (switch). Further, in the example of FIG. 15, the copy unit 70 is added to the configuration according to the first embodiment of FIG. 8.

The virtual machine 1t includes a writing unit 61, a first virtual storage area 52, and a descriptor transmitting unit 62.

The writing unit 61 writes a frame in the first virtual storage area 52 and makes a notification to the descriptor transmitting unit 62. In the second embodiment, the writing unit 61 receives in advance free reception buffer information (a second virtual storage area 56, the second storage area 57, and the like) from the reading unit 63. After writing the frame in the first virtual storage area 52, the writing unit 61 issues a hypercall (copy) to the copy unit 70. Here, the writing unit 61 designates, as a copy source, the first virtual storage area 52 (first storage area 53) in which the frame is written, and designates, as a copy destination, the second virtual storage area 56 (second storage area 57). After the copy is completed, the writing unit 61 executes processing of releasing the first virtual storage area 52, and the like.

The first virtual storage area 52 is a part of a pseudo-physical memory or virtual memory managed by the virtual machine 1r (and is mapped to the first storage area 53). The first virtual storage area 52 is used as a transmission buffer that stores a frame corresponding to a descriptor transmitted from the transfer control unit 60.

The descriptor transmitting unit 62 transmits a descriptor of a frame to the transfer control unit 60. The descriptor according to the second embodiment includes information that specifies the second storage area 57 to which the frame is copied.

The virtual machine 1u includes a reading unit 63, a second virtual storage area 56, and a descriptor receiving unit 64.

The second virtual storage area 56 is a part of a pseudo-physical memory or virtual memory managed by the virtual machine 1s (and is mapped to the second storage area 57). The second virtual storage area 56 is used as a reception buffer that stores a frame corresponding to a descriptor transmitted from the transfer control unit 60.

The descriptor receiving unit 64 receives a descriptor from the transfer control unit 60.

Once a notification is received from the descriptor receiving unit 64, the reading unit 63 reads a frame from the second virtual storage area 56.

The transfer control unit 60 refers to a descriptor received from the descriptor transmitting unit 62 to determine a transfer destination, and delivers the descriptor to the descriptor receiving unit 64 of a destination virtual machine 1. In the example of FIG. 15, the transfer control unit 60 transfers the descriptor from the virtual machine 1*t* to the virtual machine 1*u*.

In the second embodiment, the first storage area 53 is a part (physical memory area 46-1) of the physical memory 45 managed by the virtual machine monitor 2. Further, the second storage area 57 is a part (physical memory area 46-2) of the physical memory 45 managed by the virtual machine monitor 2.

When a copy request is received from the writing unit 61, the copy unit 70 copies a frame stored in the first storage area 53 to the second storage area 57. The copy unit 70 is implemented by the virtual machine monitor 2 or the like having an authority to control the physical memory area 45. Each virtual machine 1 issues a hypercall (copy) to the virtual machine monitor 2 to implement data copy in the physical memory area 45.

Third Embodiment

Next, a third embodiment will be described. In a description of the third embodiment, a description of the same content as that of the first embodiment is omitted, and only differences from the first embodiment will be described.

Figure 16:
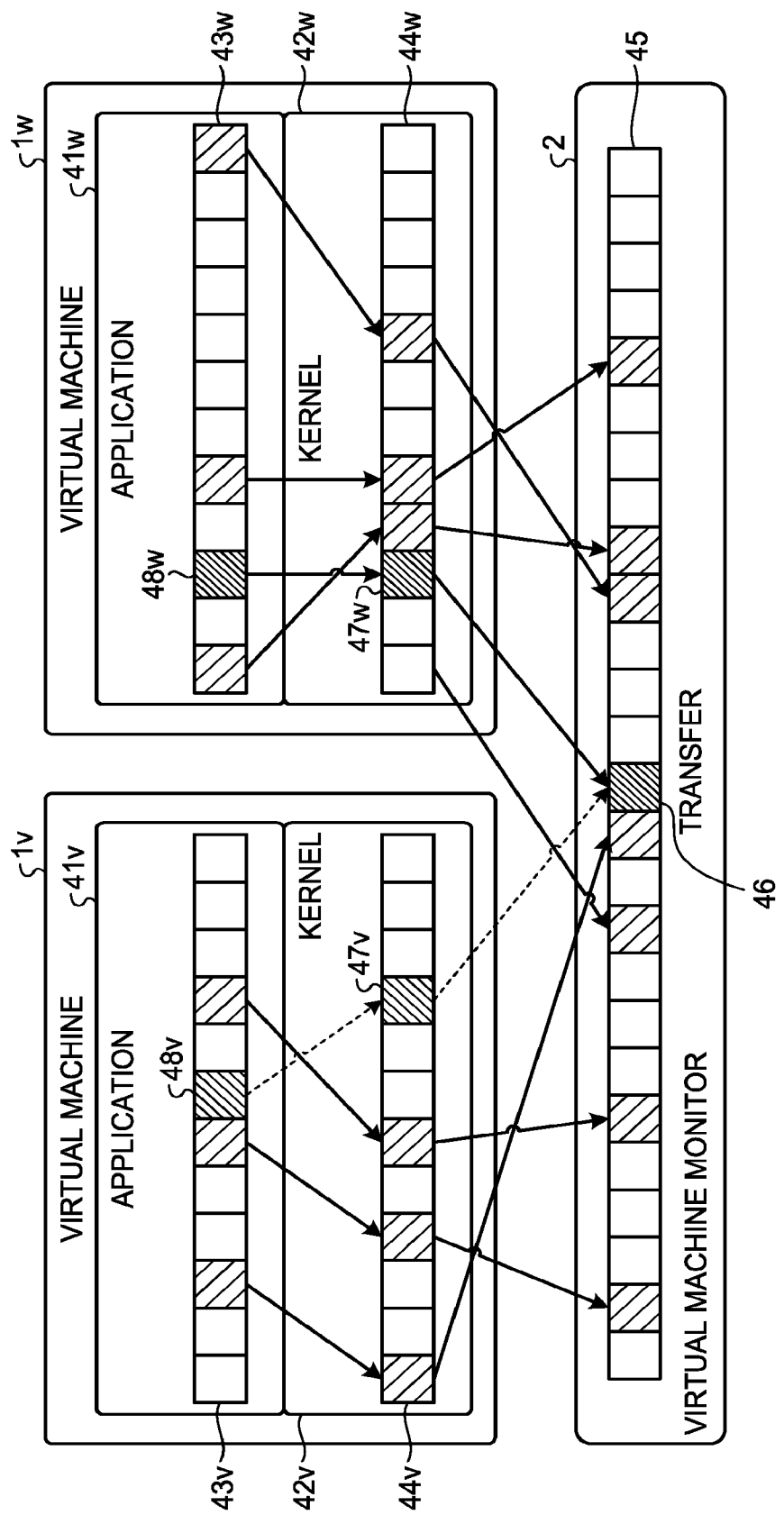
FIG. 16 is a diagram for describing data delivery between virtual machines according to a third embodiment.

In the third embodiment, data delivery between virtual machines 1 is implemented by using a hypercall (transfer) as illustrated FIG. 16.

FIG. 16 is a diagram for describing data delivery between virtual machines 1*v* and 1*w* according to the third embodiment. With the hypercall (transfer), data transfer is implemented by changing mapping between a pseudo-physical memory area (virtual memory area) managed by the MMU or the like and a physical memory area. In the example of FIG. 16, a physical memory area 46 mapped to a pseudo-physical memory area 47*v* managed by the virtual machine 1*v* is remapped to a pseudo-physical memory area 47*w* managed by the virtual machine 1*w*. By doing so, data delivery between the virtual machines 1*v* and 1*w* is implemented.

Example of Functional Configuration

Figure 17A:
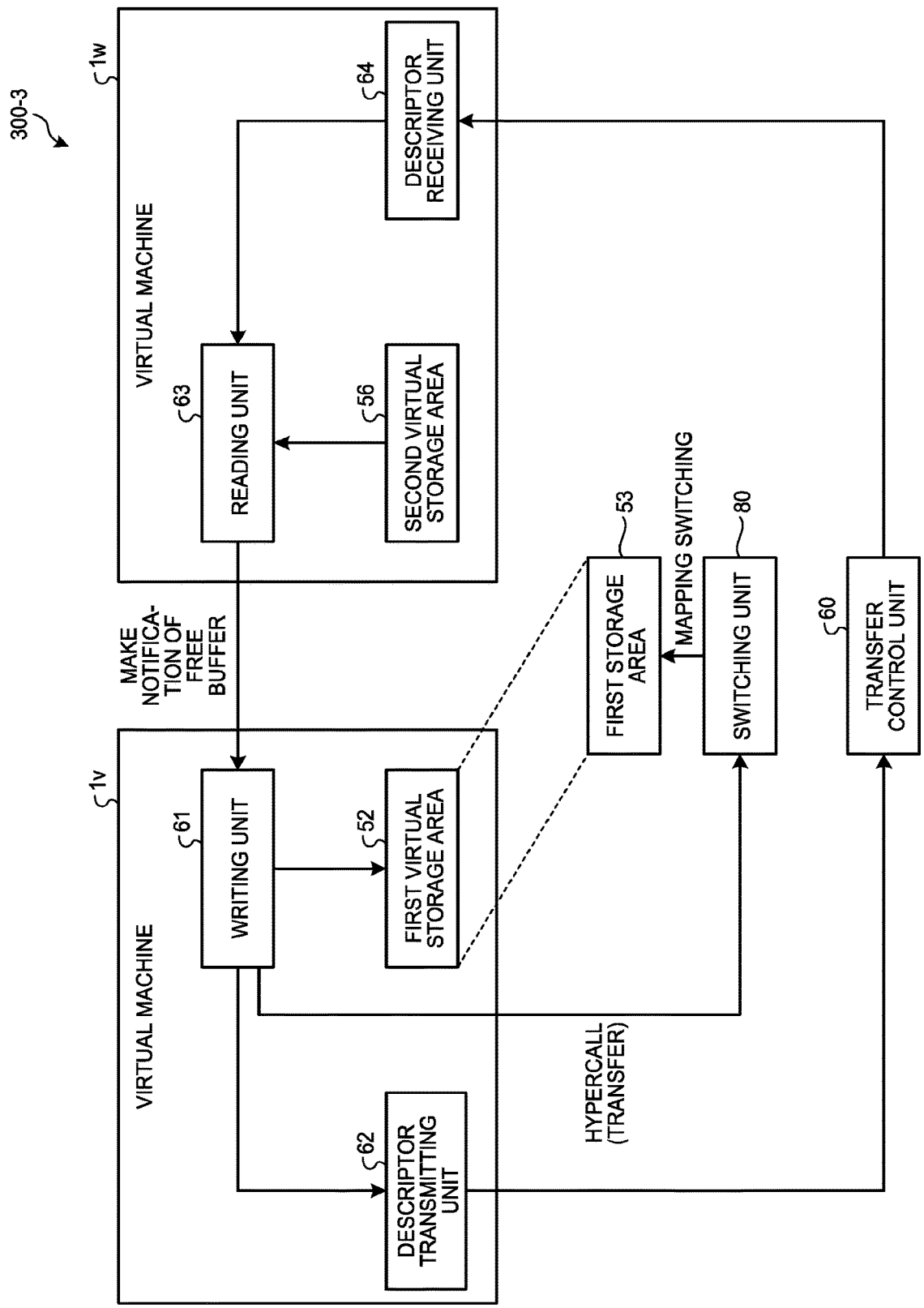
FIG. 17A is a diagram illustrating an example (before mapping switching) of a functional configuration of a communication apparatus according to the third embodiment.

FIG. 17A is a diagram illustrating an example (before mapping switching) of a functional configuration of a communication apparatus 300-3 according to the third embodiment. FIG. 17B is a diagram illustrating the example (after mapping switching) of the functional configuration of the communication apparatus 300-3 according to the third embodiment. The communication apparatus 300-3 according to the third embodiment includes the virtual machine 1*v*, the virtual machine 1*w*, a first storage area 53, a transfer control unit 60, and a switching unit 80. In the example of FIGS. 17A and 17B, two virtual machines 1*v* and 1*w* are connected to the transfer control unit 60 (switch). In addition, in the example of FIGS. 17A and 17B, the switching unit 80 is added to the configuration according to the first embodiment of FIG. 8.

The virtual machine 1*v* includes a writing unit 61, a first virtual storage area 52, and a descriptor transmitting unit 62.

The writing unit 61 writes a frame in the first virtual storage area 52 and makes a notification to the descriptor transmitting unit 62. In the third embodiment, the writing unit 61 receives in advance free reception buffer information (second virtual storage area 56) from the reading unit 63. After writing the frame in the first virtual storage area 52, the writing unit 61 issues a hypercall (transfer) to the switching unit 80. This is because the writing unit 61 switches a mapping destination of a memory area managed by itself to a reception buffer notified from the reading unit 63. In the example of FIGS. 17A and 17B, a mapping destination of the first storage area 53 in which the frame is written is switched from the first virtual storage area 52 to the second virtual storage area 56.

The first virtual storage area 52 is a part of a pseudo-physical memory or virtual memory managed by the virtual machine 1*v*. The first virtual storage area 52 is used as a transmission buffer that stores a frame corresponding to a descriptor transmitted from the transfer control unit 60.

The descriptor transmitting unit 62 transmits a descriptor of a frame to the transfer control unit 60. The descriptor according to the third embodiment includes information that specifies the second virtual storage area 56 mapped to the first storage area 53 in which the frame is stored.

The virtual machine 1*w* includes a reading unit 63, the second virtual storage area 56, and a descriptor receiving unit 64.

The descriptor receiving unit 64 receives a descriptor from the transfer control unit 60.

Once a notification is received from the descriptor receiving unit 64, the reading unit 63 reads a frame from the second virtual storage area 56.

The second virtual storage area 56 is a part of a pseudo-physical memory or virtual memory managed by the virtual machine 1*w*. The second virtual storage area 56 is used as a transmission buffer that stores a frame corresponding to a descriptor transmitted from the transfer control unit 60.

The transfer control unit 60 refers to a descriptor received from the descriptor transmitting unit 62 to determine a transfer destination, and delivers the descriptor to the descriptor receiving unit 64 of a destination virtual machine 1. In the example of FIGS. 17A and 17B, the transfer control unit 60 transfers the descriptor from the virtual machine 1*v* to the virtual machine 1*w*.

The switching unit 80 is implemented by the virtual machine monitor 2 or the MMU that has the authority to control memory mapping. Each writing unit 61 issues a hypercall (transfer) to the virtual machine monitor 2 as a mapping switching request, so that the virtual machine monitor 2 operates the MMU to switch the memory mapping. In the example of FIGS. 17A and 17B, once the hypercall (transfer) is received, the switching unit 80 remaps the first storage area 53 mapped to the first virtual storage area 52 to the second virtual storage area 56.

The first storage area 53 is a part (physical memory area 46) of the physical memory 45 managed by the virtual machine monitor 2.

Fourth Embodiment

Next, a fourth embodiment will be described. In a description of the fourth embodiment, a description of the same content as the first embodiment is omitted, and only differences from the first embodiment will be described.

Example of Functional Configuration

Figure 18:
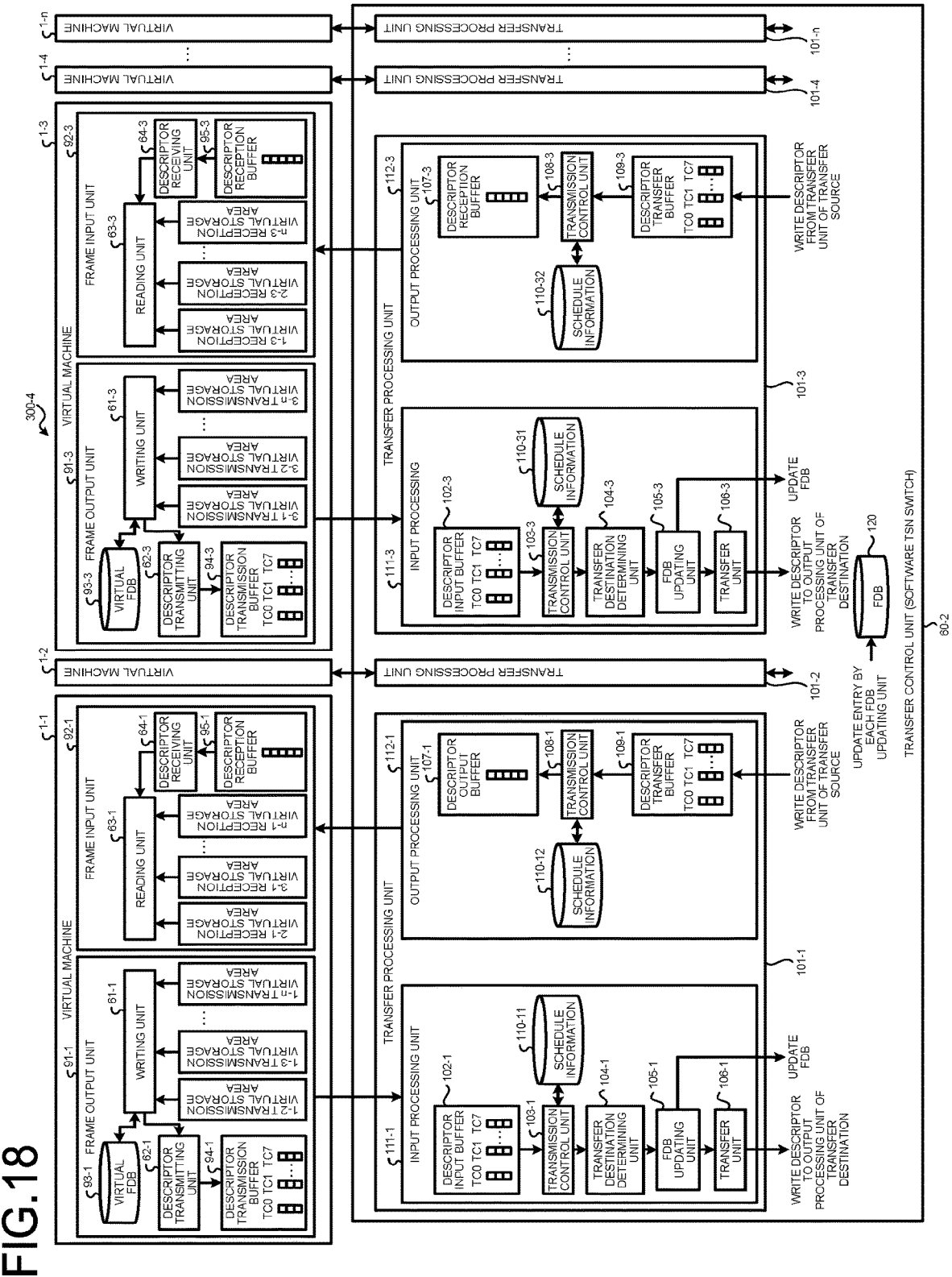
FIG. 18 is a diagram illustrating an example of a functional configuration of a communication apparatus according to a fourth embodiment.

FIG. 18 is a diagram illustrating an example of a functional configuration of a communication apparatus 300-4 according to the fourth embodiment. The communication apparatus 300-4 according to the fourth embodiment includes virtual machines 1-1 to 1-*n* and a transfer control unit 60-2. FIG. 18 illustrates an example in which the transfer control unit (switch) supports IEEE 802.1Qbv. In FIG. 18, n virtual machines 1-1 to 1-$n$ are connected to the transfer control unit 60-2.

Hereinafter, when the virtual machines 1-1 to 1-$n$ need not be distinguished, the virtual machines 1-1 to 1-$n$ will be simply referred to as virtual machine 1. Note that other functional blocks of which the number is plural may also be abbreviated when those functional blocks need not be distinguished, similarly to the virtual machines 1-1 to 1-$n$.

A virtual machine 1-1 includes a frame output unit 91-1 and a frame input unit 92-1.

The frame output unit 91-1 includes a writing unit 61-1, a descriptor transmitting unit 62-1, a virtual FDB 93-1, a descriptor transmission buffer 94-1, and a 1-2 transmission virtual storage area to a 1-$n$ transmission virtual storage area.

The frame input unit 92-1 includes a reading unit 63-1, a descriptor receiving unit 64-1, a descriptor reception buffer 95-1, and a 2-1 reception virtual storage area to an n-1 reception virtual storage area.

The virtual machines 1-2 to 1-$n$ also have the same configuration as that of the virtual machine 1-1.

The transfer control unit 60-2 includes transfer processing units 101-1 to 101-$n$ and an FDB 120. The transfer processing units 101-1 to 101-$n$ are connected to the corresponding virtual machines 1-1 to 1-$n$, respectively. Note that the transfer control unit 60-2 may be implemented by a dedicated HW instead of software.

The transfer processing unit 101-1 includes an input processing unit 111-1 and an output processing unit 112-1.

The input processing unit 111-1 includes a descriptor input buffer 102-1, a transmission control unit 103-1, a transfer destination determining unit 104-1, an FDB updating unit 105-1, a transfer unit 106-1, and schedule information 110-11.

The output processing unit 112-1 includes a descriptor output buffer 107-1, a transmission control unit 108-1, a descriptor transfer buffer 109-1, and schedule information 110-12.

The transfer processing units 101-2 to 101-$n$ also have the same configuration as that of the transfer processing unit 101-1.

First, the virtual FDB 93 will be described. A pseudo-physical memory (virtual memory) that stores the virtual FDB 93 of each virtual machine 1 is mapped to a storage unit (physical memory) that stores the FDB 120 of the transfer control unit 60-2. That is, the respective virtual machines 1 refer to the same FDB 120. Mapping between the virtual FDB 93 and the FDB 120 is performed, for example, when the communication apparatus 300-4 (switch) is initialized.

Further, in the example of FIG. 18, the update of the FDB 120 is performed by the transfer control unit 60-2 (FDB updating unit 105), and the frame output unit 91 performs reading (Read-Only). The FDB 120 (virtual FDB 93) includes information for determining a transfer destination of the frame. Specifically, the information for determining the transfer destination includes information such as an identifier of a transfer destination network port (network interface or virtual machine 1), a MAC address, a VLAN ID, and the last transmission time.

Next, a transmission virtual storage area of the frame output unit 91 and a reception virtual storage area of the frame input unit 92 will be described. The transmission virtual storage area is used as a transmission buffer of the frame output unit 91, and the reception virtual storage area is used as a reception buffer of the frame input unit 92. The transmission/reception virtual storage area is divided into areas for each pair of a transfer source virtual machine 1 and a destination virtual machine 1. For example, in a case where a frame whose transfer source is a virtual machine 1 and whose destination is a virtual machine 3 is transferred, the 1-3 transmission virtual storage area and the 1-3 reception virtual storage area are used.

Figure 19A:
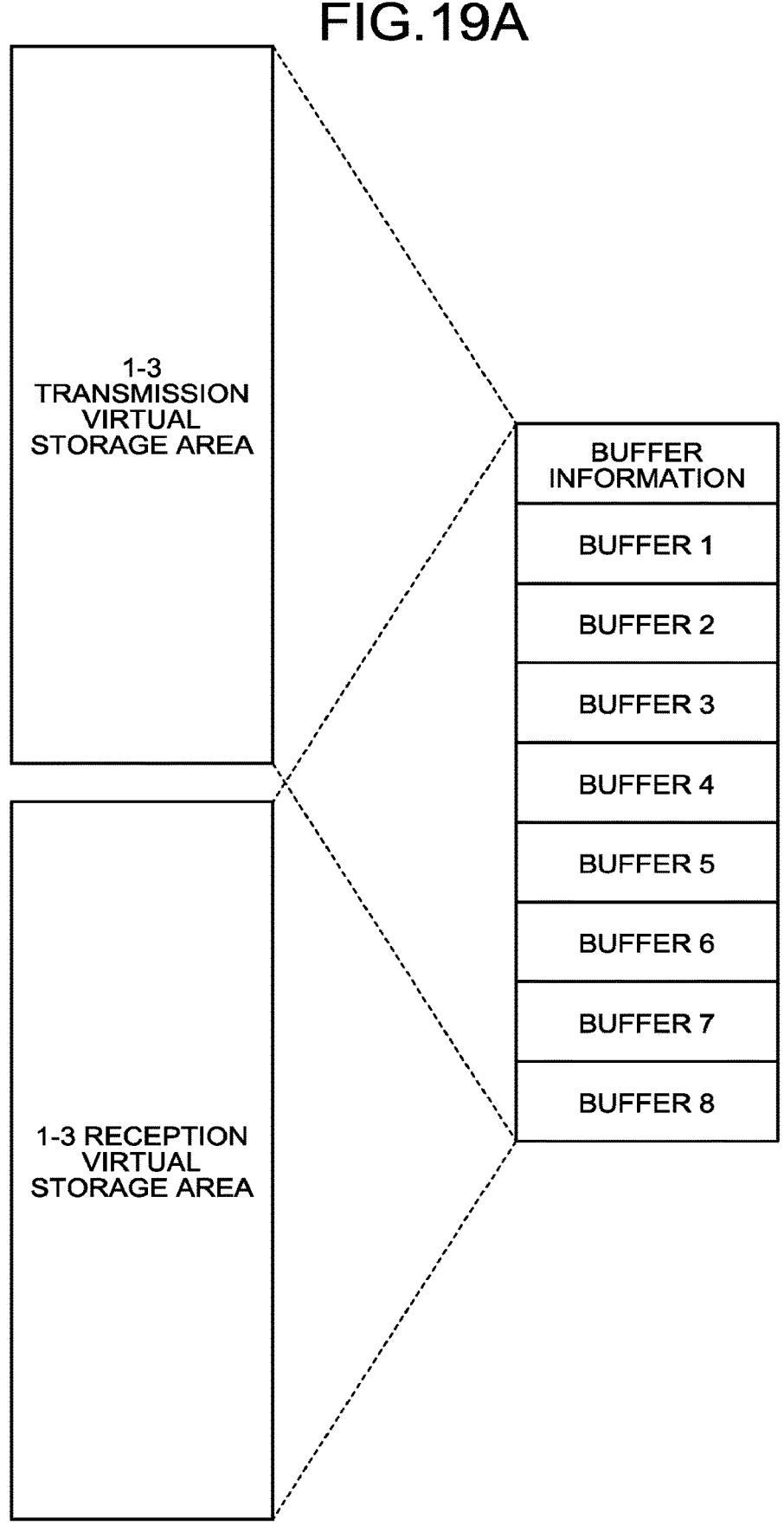
FIG. 19A is a diagram illustrating an example of a transmission virtual storage area and a reception virtual storage area according to the fourth embodiment.
Figure 19B:
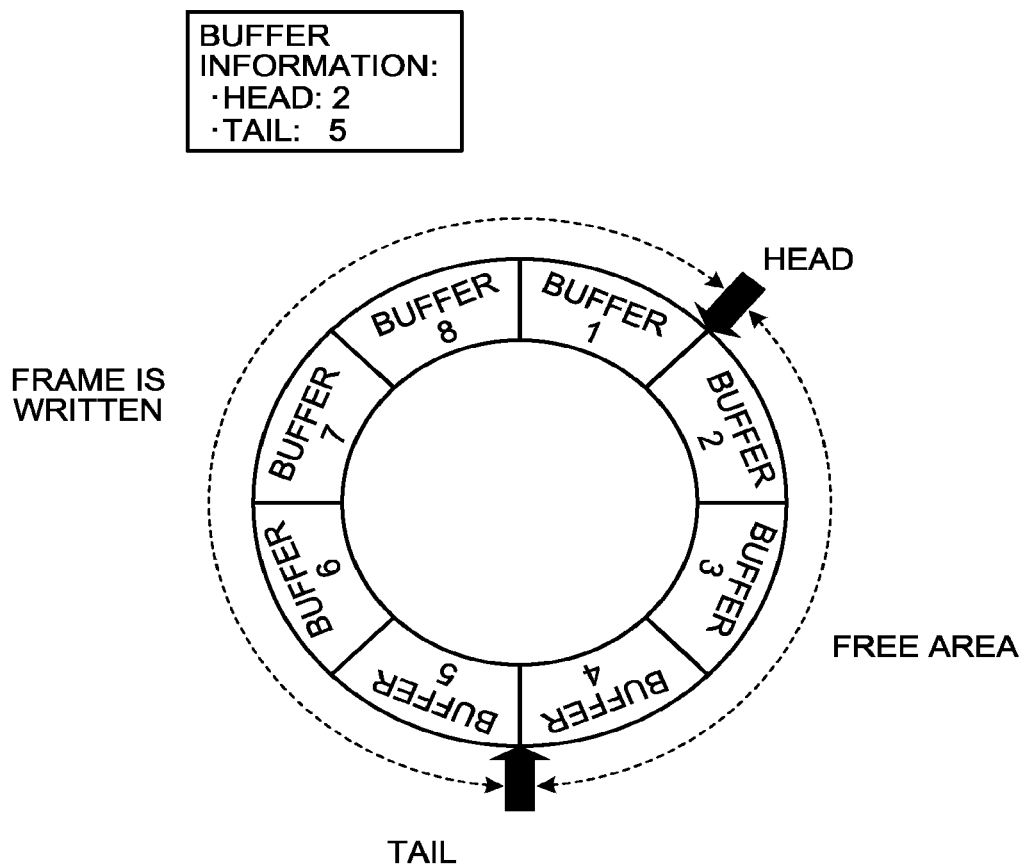
FIG. 19B is a diagram illustrating an example of a structure of each of the storage areas in FIG. 19A.

FIG. 19A is a diagram illustrating an example of the 1-3 transmission virtual storage area and the 1-3 reception virtual storage area according to the fourth embodiment. FIG. 19B is a diagram illustrating an example of a structure of each of the storage areas of FIG. 19A.

It is assumed that the 1-3 transmission virtual storage area and the 1-3 reception virtual storage area are managed, for example, like a ring buffer in FIG. 19B, and a plurality of frames can be read and written at the same time, but the present invention is not limited thereto.

In a case where data delivery is implemented by the method according to the first embodiment, the same physical memory area 46 (first storage area) is mapped for each pair of the above transmission/reception virtual storage areas.

In a case where data delivery is implemented by the method according to the second embodiment, data is copied from the physical memory area 46-1 to which the transmission virtual storage area is mapped to the physical memory area 46-2 to which the reception virtual storage area is mapped, for each pair of the above transmission/reception virtual storage areas.

In a case where data delivery is implemented by the method according to the third embodiment, the physical memory area 46 to which the transmission virtual storage area is mapped is remapped to the reception virtual storage area, for each pair of the above transmission/reception virtual storage areas.

Hereinafter, in the fourth embodiment, a method in which the transmission virtual storage area and the reception virtual storage area are mapped to the same physical memory area 46 in advance at the time of starting the switch or the like will be described as an example.

Next, the descriptor transmission buffer 94 and the descriptor input buffer 102 will be described. The descriptor transmission buffer 94 and the descriptor input buffer 102 are divided into queues (FIFOs) for each traffic class (TC) of a frame. A correspondence between a priority code point (PCP) included in an IEEE 802.1Q header and the traffic class is specified in advance.

The descriptor transmission buffer 94 is a virtual memory area (pseudo-physical memory area) managed by the virtual machine 1. The descriptor input buffer 102 is a memory area managed by the transfer control unit 60-2.

The descriptor transmission buffer 94 and the descriptor input buffer 102 map the same physical memory area in advance, for example, when the communication apparatus 300-4 (switch) is initialized. The descriptor transmission buffer 94 and the descriptor input buffer 102 are used to deliver the descriptor between the frame output unit 91 and an input processing unit 111.

Next, the descriptor reception buffer 95 and the descriptor output buffer 107 will be described. The descriptor reception buffer 95 is a virtual memory area (pseudo-physical memory area) managed by the virtual machine 1. The descriptor output buffer 107 is a memory area managed by the transfer control unit 60-2.

The descriptor reception buffer 95 and the descriptor output buffer 107 map the same physical memory area in advance, for example, when the communication apparatus 300-4 (switch) is initialized. The descriptor reception buffer 95 and the descriptor output buffer 107 are used to deliver a descriptor between the frame input unit 92 and the output processing unit 112.

Next, an operation according to the fourth embodiment will be described.

First, the frame output unit 91 will be described. First, the writing unit 61 receives a transfer target frame from an application or network stack. The writing unit 61 refers to header information of the received frame and the virtual FDB to determine a frame transfer destination.

The writing unit 61 writes the frame in a transmission virtual storage area for the destination virtual machine 1. In a case where the ring buffer is used as in FIG. 19B, the writing unit 61 refers to the buffer information, and writes, in a case where there is a free area, the frame in a buffer of Head and advances Head by 1.

In a case where there is no free area, the writing unit 61 discards the frame or waits until the destination virtual machine 1 releases the buffer (waits until there is a free area). Alternatively, for example, the writing unit 61 may check Head/Tail by polling. Alternatively, for example, a control interface for the destination virtual machine 1 to notify that there is a free area may be separately provided.

The writing unit 61 issues a frame writing notification to the descriptor transmitting unit 62. With the frame writing notification, an identifier of the transfer destination virtual machine 1, position information of the transmission virtual storage area in which the frame is written (an identifier of the ring buffer or the like), information necessary for transfer processing, such as a MAC address and a VLAN ID, information required for TSN processing such as a priority code point (PCP) or a traffic class of a frame, and a frame size, and the like are notified.

Next, an operation of the descriptor transmitting unit 62 will be described. The descriptor transmitting unit 62 determines a position of the descriptor transmission buffer 94 in which the descriptor is to be written, based on a PCP or TC included in a received frame writing notification. The descriptor transmitting unit 62 stores the information received from the writing unit 61 in the descriptor and writes the descriptor in the descriptor transmission buffer 94. The descriptor may include a transmission time, statistical information, or the like, in addition to the information included in the frame writing notification received from the writing unit 61.

Further, for example, the descriptor transmitting unit 62 may receive only a buffer address of the transmission virtual storage area in which the frame is written by the writing unit 61, and the descriptor transmitting unit 62 may refer to header information and the like of the frame from the buffer to generate or write a descriptor. As described above, since the descriptor transmission buffer 94 is mapped to the same physical memory as the descriptor input buffer 102 of the transfer control unit 60-2, the descriptor transmission buffer 94 can be referenced by a transmission control unit 103 to be described later.

The operation of the frame output unit 91 has been described above.

Next, the input processing unit 111 of the transfer processing unit 101 will be described.

First, an operation of the transmission control unit 103 will be described. First, the transmission control unit 103 checks a traffic class permitted for transmission, from a current time and the schedule information (gate control list). Next, the transmission control unit 103 reads a descriptor of a transfer target frame from a queue (descriptor input buffer 102) of the traffic class permitted for transmission. In a case where frames (descriptors) of a plurality of traffic classes can be transmitted, the transmission control unit 103 determines a frame to be transferred by a method such as Strict Priority or Credit Based Shaper (IEEE 802.1Qav). The transmission control unit 103 inputs the read descriptor to the transfer destination determining unit 104. In a case where there is no frame that can be transmitted, the processing ends and the next frame transmission processing is performed (waiting until a new descriptor is written, waiting until a schedule state is changed, or the like).

The above-described operation is the operation of the transmission control unit 103. In addition to the above processing, the transmission control unit 103 may execute processing of determining whether the frame can be transmitted within a time allowed by a schedule in consideration of a guard band or the like, based on a frame size, a current time, and schedule information stored in the read descriptor. Further, although the processing of IEEE 802.1Qbv is assumed in the fourth embodiment, the present invention is not limited thereto.

Next, an operation of the transfer destination determining unit 104 will be described. The transfer destination determining unit 104 refers to an identifier of a transfer destination virtual machine 1 described in the descriptor, and determines the descriptor transfer buffer 109 in which the descriptor is to be written. For example, in a case where the transfer destination is the virtual machine 1-3, a descriptor transfer buffer 109-3 of the transfer processing unit 101-3 is a writing destination.

Next, an operation of the FDB updating unit 105 will be described. First, the FDB updating unit 105 checks whether or not an entry (MAC address and VLAN ID) of the transmission source virtual machine 1 exists in the FDB 120. In a case where the entry does not exist, the FDB updating unit 105 registers the entry and writes a network interface, a MAC address, a VLAN ID, the last transmission time, and the like. In a case where the entry exists, for example, the latest time of the entry is updated.

Finally, an operation of the transfer unit 106 will be described. The transfer unit 106 writes the descriptor in a queue of a corresponding traffic class of the descriptor transfer buffer 109 determined by the transfer destination determining unit 104. In a case of a single-task operation (for example, a case of an operation with a single-core CPU), the input processing unit 111 of each virtual machine 1 is operated in order, and thus the input of the descriptor is serialized in the descriptor transfer buffer 109. On the other hand, in a case of a multi-task operation (for example, a case of an operation with a multi-core CPU or a case of parallel processing in HW), since multiple input processings of the respective virtual machines 1 are executed in parallel, in the writing to the descriptor transfer buffer 109, it is necessary to prevent contention in access by taking a lock or the like to serialize a transfer order of the descriptors.

The above-described operation is the operation of the input processing unit 111. The input processing unit 111 can transfer the frame (descriptor) transmitted from each virtual machine 1 to the output processing unit 112 for the destination virtual machine 1 according to a transmission timing of IEEE 802.1Qbv. This means that the Qbv processing of the network interface of the transmission source virtual machine 1 is performed (corresponding to Tx_be in FIG. 4).

Next, an operation of the output processing unit 112 will be described. In an operation of the transmission control unit 108, basically, the same processing as that of the transmission control unit 103 of the input processing unit 111 is performed. In the transmission control unit 108 of the output processing unit 112, a reading source buffer is the descriptor transfer buffer 109, and a writing destination is the descriptor output buffer 107 (descriptor reception buffer 95). Here, the descriptor output buffer 107 (descriptor reception buffer 95) of FIG. 18 provides one queue (FIFO), but may also be divided into queues for each traffic class, similarly to the descriptor input buffer 102 or the descriptor transfer buffer 109.

The above-described operation is the operation of the output processing unit 112. The output processing unit 112 can transfer the descriptor to the destination virtual machine 1 according to the transmission timing of IEEE 802.1Qbv. This means that the Qbv processing of the network interface of the transfer control unit 60-2 (switch) is performed (corresponding to Tx in FIG. 4).

Next, an operation of the frame input unit 92 will be described. First, the descriptor receiving unit 64 reads a descriptor from a queue (FIFO) of the descriptor buffer 95. The descriptor receiving unit 64 specifies a transmission virtual storage area in which the frame is stored from the descriptor and makes a notification to the reading unit 63.

The reading unit 63 refers to buffer information of the notified virtual storage area (FIG. 19B), reads the first frame (a frame written at a Tail position), and delivers the frame to the application or network stack. Once the frame delivery is completed, the reading unit 63 releases the buffer and increments Tail by +1.

The above-described operation is the transfer operation according to the fourth embodiment. Hereinafter, some additional descriptions will be provided.

First, the mapping between the transmission/reception virtual storage area and the physical memory area 45 will be additionally described. The mapping between the transmission/reception virtual storage area and the physical memory area 45 may be performed, for example, when the communication apparatus 300-4 (switch) is initialized. Alternatively, for example, the mapping between the transmission/reception virtual storage area and the physical memory area 45 may be performed by issuing a hypercall (map)/(unmap) each time a frame is transmitted as in the first embodiment.

Alternatively, for example, the mapping between the transmission/reception virtual storage area and the physical memory area 45 may be performed at a timing at which a new entry is registered in the FDB 120. In this case, for example, the mapping between the transmission/reception virtual storage area and the physical memory area 45 is released at a timing at which the entry is deleted from the FDB 120 because, for example, frame transmission is not performed for a certain period.

In other words, the timing at which a new entry is registered in the FDB 120 is a timing at which a communication pair of a transmission source virtual machine 1 and a destination virtual machine 1 is generated. By doing so, unnecessary use of memory resources is prevented by not mapping (not using) the transmission/reception virtual storage area when communication is not established between the virtual machines 1, which is advantageous.

As an example of the operation, in a case where an entry of a communication interface of a transmission destination does not exist when the writing unit 61 refers to the virtual FDB 93, a new transmission virtual storage area is secured and set so that another virtual machine 1 can perform mapping (hypercall (setup)). A frame of which an entry does not exist in the FDB 120 is multicast (broadcast) and transferred to the frame input unit 92 of each of all virtual machines 1. Here, the writing unit 61 (or the descriptor transmitting unit 62) adds, to the descriptor, information indicating that the frame is to be multicast (broadcast).

The reading unit 63 refers to the descriptor received from the transfer control unit 60, and in a case where the frame is to be multicast (broadcast) and the reading unit 63 is the reading unit 63 of the virtual machine 1 that is a transfer destination of the frame, the reading unit 63 newly secures a reception virtual storage area and maps the reception virtual storage area to a transmission virtual storage area described in the descriptor (hypercall (map)). Specifically, the reading unit 63 maps the reception virtual storage area corresponding to the transfer destination virtual machine 1 to the first storage area to which the transmission virtual storage area corresponding to the transfer source virtual machine 1 is mapped.

Next, the buffer information (FIGS. 19A and 19B) will be additionally described. In the fourth embodiment, the buffer information is held in the transmission/reception virtual storage area to specify a free buffer area and a buffer area in which a frame is written. As another configuration, a configuration in which only the buffer is managed on the transmission/reception virtual storage area and the buffer information is included in the descriptor can be considered. Since a position of a buffer in which a frame is stored can be specified in the descriptor, the writing unit 61/reading unit 63 does not need to read/write the buffer information from/in the reception virtual storage area. In this case, after the reading unit 63 reads the frame, the frame output unit 91 is separately notified that the buffer is released (in the fourth embodiment, the notification is made by updating Tail). As a notification method, a method of making a transfer completion notification to the frame output unit 91 via the transfer control unit 60-2 can be considered.

As described above, the communication apparatus 300-4 according to the fourth embodiment includes the plurality of virtual machines 1-1 to 1-n and the transfer control unit 60-2.

Each virtual machine 1 includes a plurality of transmission virtual storage areas (first virtual storage areas) specified for each virtual machine 1 as a frame transfer destination and a plurality of reception virtual storage areas (second virtual storage areas) specified for each frame transfer source. The writing unit 61 refers to virtual transfer destination information (virtual FDB 93) to determine the frame transfer destination, and writes a frame in a first virtual storage area corresponding to the transfer destination virtual machine 1. The descriptor receiving unit 64 receives a descriptor of the frame. When the descriptor is received by the descriptor receiving unit 64, the reading unit 63 reads the frame from a second virtual storage area specified based on the descriptor.

Further, in the transfer control unit 60-2, the storage unit stores transfer destination information (FDB 120) mapped to the virtual transfer destination information (virtual FDB). The input processing unit 111 controls a timing for inputting the descriptor of the frame to the output processing unit 112 based on schedule information. The output processing unit 112 controls a timing for outputting the descriptor to the transfer destination virtual machine 1 based on the schedule information when the descriptor is received from the input processing unit 111.

Finally, an example of a hardware configuration of each of the communication apparatuses 300 to 300-4 according to the first to fourth embodiments will be described.

Example of Hardware Configuration

Figure 20:
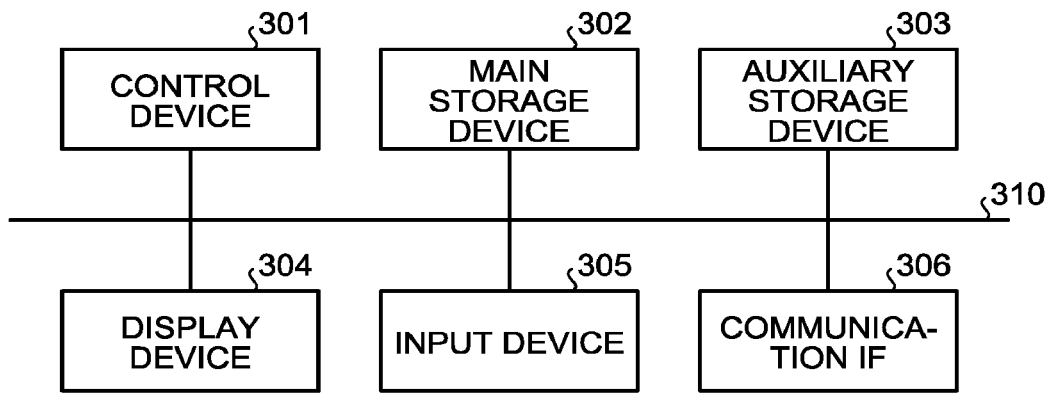
FIG. 20 is a diagram illustrating an example of a hardware configuration of each of the communication apparatuses according to the first to fourth embodiments.

FIG. 20 is a diagram illustrating an example of a hardware configuration of each of the communication apparatuses 300 to 300-4 according to the first to fourth embodiments.

The communication apparatuses 300 to 300-4 each include a control device 301, a main storage device 302, an auxiliary storage device 303, a display device 304, an input device 305, and a communication IF 306. The control device 301, the main storage device 302, the auxiliary storage device 303, the display device 304, the input device 305, and the communication IF 306 are connected via a bus 310.

The control device 301 executes a program that the main storage device 302 reads from the auxiliary storage device 303. The main storage device 302 is a memory such as a read only memory (ROM) and a random access memory (RAM). The auxiliary storage device 303 is a hard disk drive (HDD), a solid state drive (SSD), a memory card, or the like.

The display device 304 displays display information. The display device 304 is, for example, a liquid crystal display. The input device 305 is an interface for operating a computer made to operate as the communication apparatus 300. The input device 305 is, for example, a keyboard or a mouse. Note that the display device 304 and the input device 305 may use a display function and an input function of an external management terminal or the like connectable to the communication apparatuses 300 to 300-4.

The communication IF 306 is an interface for performing communication with other devices.

The program executed by the computer is an installable or executable file, is recorded in a computer-readable storage medium such as a CD-ROM, a memory card, a CD-R, or a digital versatile disc (DVD), and is provided as a computer program product.

Further, the program executed by the computer may be stored in a computer connected to a network such as the Internet and may be provided by being downloaded via the network. Alternatively, the program executed by the computer may be provided via a network such as the Internet without being downloaded.

Further, the program executed by the computer may be provided by being incorporated in a ROM or the like in advance.

The program executed by the computer has a module configuration including functional blocks that can also be implemented by a program in the functional configuration (functional blocks) of the communication apparatus 300 described above. As the actual hardware, the control device 301 reads the program from a storage medium and executes the program, such that the respective functional blocks are loaded on the main storage device 302. That is, the respective functional blocks are generated on the main storage device 302.

Note that some or all of the functional blocks described above may be implemented by hardware such as an integrated circuit (IC) instead of being implemented by software.

Further, in a case of implementing the respective functions using a plurality of processors, each processor may implement one of the functions, or may implement two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Example 1. A communication apparatus includes a plurality of virtual machines and a transfer control unit. Each of the virtual machines includes a plurality of first virtual storage areas, a writing unit, a plurality of second virtual storage areas, a descriptor receiving unit, and a reading unit. The plurality of first virtual storage areas are specified for each virtual machine as a transfer destination of a frame. The writing unit refers to virtual transfer destination information to determine the transfer destination of the frame, and writes the frame in a first virtual storage area corresponding to a virtual machine as the transfer destination. The plurality of second virtual storage areas are specified for each transfer source of the frame. The descriptor receiving unit receives a descriptor of the frame. The reading unit reads the frame from a second virtual storage area specified based on the descriptor when the descriptor is received by the descriptor receiving unit. The transfer control unit includes a storage unit, an input processing unit, and an output processing unit. The storage unit stores transfer destination information mapped to the virtual transfer destination information. The input processing unit controls, based on schedule information, a timing for inputting the descriptor of the frame to the output processing unit. The output processing unit controls, based on the schedule information, a timing for outputting the descriptor to a virtual machine as the transfer destination when the descriptor is received from the input processing unit.

Example 2. In the communication apparatus according to example 1, the first virtual storage area is mapped to a first storage area. The writing unit adds information indicating multicast to the descriptor in a case where an entry of the frame does not exist in the virtual transfer destination information. In a case where the information indicating the multicast is added to the descriptor and a reading unit is of the virtual machine as the transfer destination of the frame, the reading unit maps the second virtual storage area corresponding to the virtual machine as the transfer destination to the first storage area to which the first virtual storage area corresponding to a virtual machine as the transfer source is mapped.

What is claimed is:

1. A communication apparatus comprising:
   a plurality of network nodes that performs communication; and
   a transfer control network node that controls a timing for transferring a descriptor of a frame by a network node of the plurality of network nodes, wherein
   each transmission-side network node comprises:
      a writing unit that writes, before the timing for transferring the descriptor of the frame, the frame in a first virtual storage area; and
      a descriptor transmitting unit that, after the writing unit writes the frame in the first virtual storage area, delivers the descriptor to a transfer control unit;
   the transfer control network node comprises:
      the transfer control unit that controls the timing for transferring the descriptor of the frame, the transfer control unit comprising:
         a first transmission control unit that transfers the descriptor according to first schedule information indicating a frame transmission timing of the transmission-side network node; and
         a second transmission control unit that transfers the descriptor according to second schedule information indicating a frame transmission timing of the transfer control network node; and each reception-side network node comprises:
  a descriptor receiving unit that receives the descriptor; and
  a reading unit that reads the frame from a second virtual storage area specified based on the descriptor when the descriptor is received by the descriptor receiving unit.

2. The apparatus according to claim 1, wherein
the frame is stored in a first storage area mapped in advance to the first virtual storage area and the second virtual storage area, and
the descriptor includes information that specifies the first storage area in which the frame is stored.

3. The apparatus according to claim 1, wherein
the first virtual storage area is mapped to a first storage area,
the descriptor includes information that specifies the first storage area mapped to the first virtual storage area in which the frame is stored, and
when the descriptor is received by the descriptor receiving unit, the reading unit maps the second virtual storage area to the first storage area and reads the frame from the second virtual storage area.

4. The apparatus according to claim 1, wherein
the first virtual storage area is mapped to a first storage area,
the second virtual storage area is mapped to a second storage area,
the apparatus further comprises a copy unit that copies the frame stored in the first storage area to the second storage area when a copy request is received from the writing unit, and
the descriptor includes information that specifies the second storage area to which the frame is copied.

5. The apparatus according to claim 1, wherein
the first virtual storage area is mapped to a first storage area,
the apparatus further comprises a switching unit that switches a storage area mapped to the first storage area from the first virtual storage area to the second virtual storage area when a mapping switching request is received from the writing unit, and
the descriptor includes information that specifies the second virtual storage area mapped to the first storage area in which the frame is stored.

6. The apparatus according to claim 1, wherein
the first virtual storage area is managed by a first virtual machine, and
the second virtual storage area is managed by a second virtual machine.

7. The apparatus according to claim 1, wherein each of the first schedule information and the second schedule information is defined based on IEEE 802.1Qbv.

8. The apparatus according to claim 1, wherein
the transfer control unit determines the reception-side network node by referring to a forwarding/filtering database (FDB) including information used for determining a transfer destination of the frame;
the transmission-side network node further comprises a virtual FDB that is mapped to a physical memory storing the FDB and that stores therein same information as information of the FDB; and
the writing unit determines, by referring to the virtual FDB, the reception-side network node and writes the frame in an area in the first virtual storage area corresponding to the determined reception-side network node.

9. The apparatus according to claim 1, wherein
the first transmission control unit controls, by using a system clock in the transfer control network, the timing for transferring the descriptor of the frame based on the first schedule information, and
the second transmission control unit controls, by using the system clock, the timing for transferring the descriptor of the frame based on the second schedule information.

10. A communication method comprising:
by each transmission-side network node of a plurality of network nodes that performs communication,
  writing, before a timing for transferring a descriptor of a frame, the frame in a first virtual storage area; and
  after writing the frame in the first virtual storage area, delivering the descriptor to a transfer control unit;
by a transfer control network node that controls the timing for transferring the descriptor of the frame by a network node of the plurality of network nodes,
  controlling the timing for transferring the descriptor of the frame, the controlling comprising:
    first transferring of the descriptor according to first schedule information indicating a frame transmission timing of the transmission-side network node, and
    second transferring of the descriptor according to second schedule information indicating a frame transmission timing of the transfer control network node; and
by each reception-side network node of the plurality of network nodes, receiving the descriptor; and
  reading the frame from a second virtual storage area specified based on the descriptor when the descriptor is received.

11. A computer program product comprising a non-transitory computer-readable medium including programmed instructions, the instructions causing a computer to function as:
a plurality of network nodes that performs communication; and
a transfer control network node that controls a timing for transferring a descriptor of a frame by a network node of the plurality of network nodes, wherein
each transmission-side network node comprises:
  a writing unit that writes, before the timing for transferring the descriptor of the frame, the frame in a first virtual storage area; and
  a descriptor transmitting unit that, after the writing unit writes the frame in the first virtual storage area, delivers the descriptor to a transfer control unit;
the transfer control network node comprises:
  the transfer control unit that controls the timing for transferring the descriptor of the frame, the transfer control unit comprising:
    a first transmission control unit that transfers the descriptor according to first schedule information indicating a frame transmission timing of the transmission-side network node; and
    a second transmission control unit that transfers the descriptor according to second schedule information indicating a frame transmission timing of the transfer control network node; and
each reception-side network node comprises:
  a descriptor receiving unit that receives the descriptor; and a reading unit that reads the frame from a second virtual storage area specified based on the descriptor when the descriptor is received by the descriptor receiving unit.

* * * * *